United States Patent [19]

Hashidate

[11] Patent Number: 4,692,887
[45] Date of Patent: Sep. 8, 1987

[54] CIRCLE AND CIRCULAR ARC GENERATOR

[75] Inventor: Katsuro Hashidate, Tokyo, Japan

[73] Assignee: Casio Computer Co., Ltd., Tokyo, Japan

[21] Appl. No.: 604,057

[22] Filed: Apr. 26, 1984

[30] Foreign Application Priority Data

| May 10, 1983 | [JP] | Japan | 58-81467 |
| May 10, 1983 | [JP] | Japan | 58-81468 |
| May 10, 1983 | [JP] | Japan | 58-81469 |
| May 10, 1983 | [JP] | Japan | 58-81471 |

[51] Int. Cl.$^4$ ............................ G06F 1/02; G06F 7/64
[52] U.S. Cl. .................................... 364/720; 364/702
[58] Field of Search ...................... 364/720, 718, 702; 340/732, 739, 749, 723, 724, 727, 747

[56] References Cited

U.S. PATENT DOCUMENTS

| 3,735,389 | 5/1973 | Tarczy-Hornoch | 340/739 |
| 3,761,765 | 9/1973 | Machin et al. | 340/747 |
| 3,789,200 | 1/1974 | Childress et al. | 340/747 |
| 4,314,351 | 2/1982 | Postel et al. | 364/720 |
| 4,484,298 | 11/1984 | Inoue et al. | 364/720 |
| 4,493,032 | 1/1985 | Johnson | 364/702 |
| 4,535,328 | 8/1985 | Morey | 340/735 |
| 4,591,843 | 5/1986 | Pratt | 340/732 |

FOREIGN PATENT DOCUMENTS

| 0049360 | 4/1982 | European Pat. Off. . |
| 1515385 | 6/1978 | United Kingdom . |
| 1587200 | 4/1981 | United Kingdom . |
| 1596506 | 8/1981 | United Kingdom . |

OTHER PUBLICATIONS

Danielson; "Incremental Curve Generation"; *IEEE Trans. on Computers;* vol. C-19, No. 9, pp. 783-793, Sep. 1970.

Jordan et al.; An Improved Algorithm for the Generation of Nonparametic Curves"; *IEEE Trans. on Computers;* vol. C-22, No. 12, pp. 1052-1060; Dec. 1973.

Primary Examiner—Archie E. Williams, Jr.
Assistant Examiner—Dale M. Shaw
Attorney, Agent, or Firm—Frishauf, Holtz, Goodman & Woodward

[57] ABSTRACT

A circle and circular arc generator has a digital differential analyzer (DDA) for receiving coordinates on and a radius of a circle having its center at a specific point and for generating x and y coordinates on a circle having its center at the origin. THe DDA has a carry detecting section for correcting the x or y coordinates for plotting an ellipse. The x coordinates and the radius of the circle are supplied from the DDA to a subtracter which adds and subtracts the input data to obtain x coordinates of rightmost and leftmost points of the target circle. The x and y coordinates from the DDA are incremented by incrementers and decremented by decrementers so as to obtain four points on the target circle which are symmetrical about the specific point. The generator also has a microprocessor for receiving start and end angles of the target circle and calculating status bit data which represent whether or not dots of the respective quadrants are plotted and position bit data which represent the relationships between coordinates of a current point and those of the start point and between coordinates of the current point and those of the end point. The x and y coordinates of the four points are plotted on the target circle in accordance with control data as combinations of the status bit data and the position bit data.

16 Claims, 28 Drawing Figures

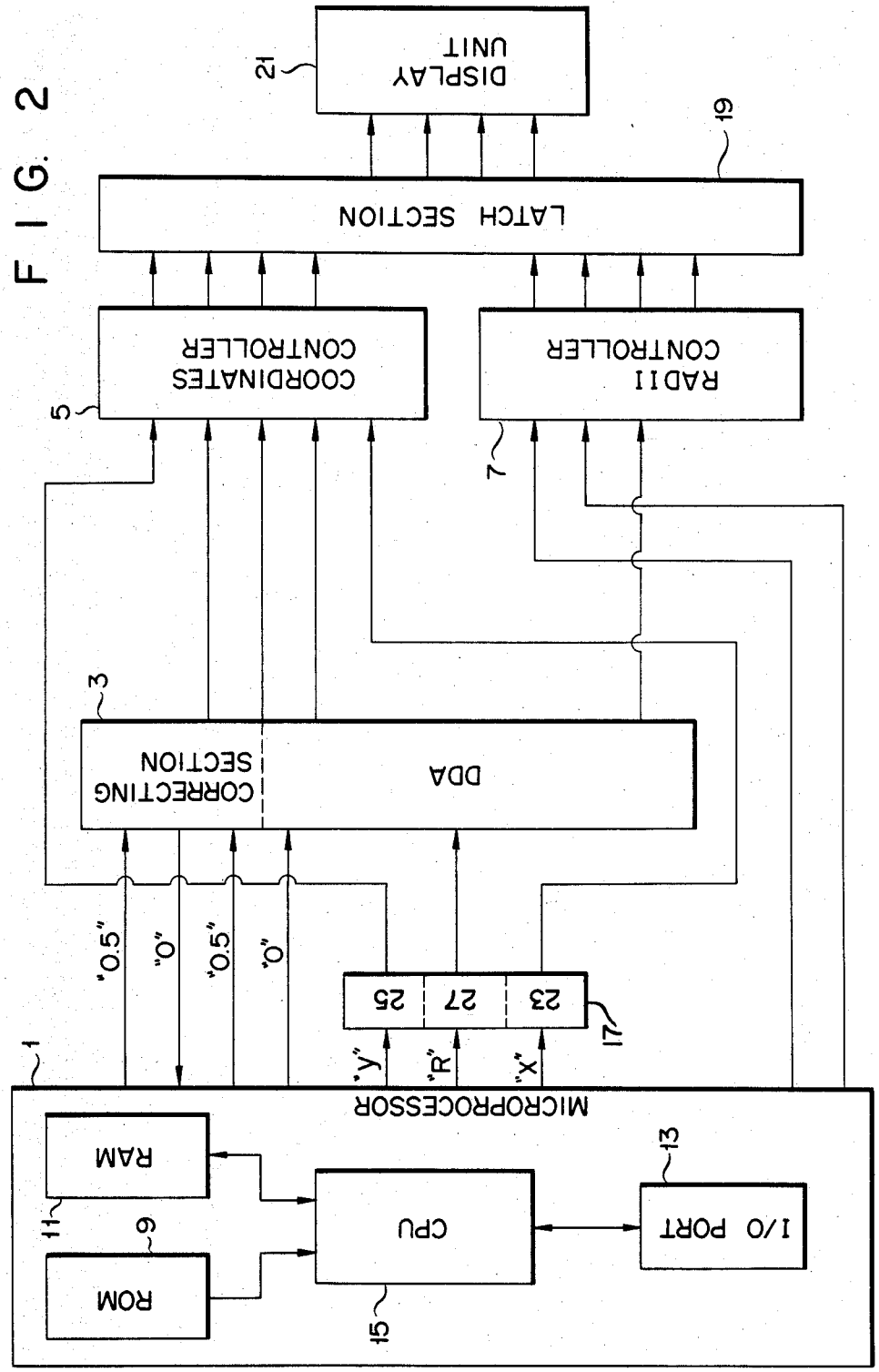

```
CORRECTION | 0 0 0 0 1 0 0 0 |
             +
WK         | 0 0 0 0 0 0 0 0 |
             ⇓
WK         | 0 0 0 0 1 0 0 0 |
             +
CORRECTION | 0 0 0 0 1 0 0 0 |
             =
WK         | 0 0 0 1 0 0 0 0 |
```

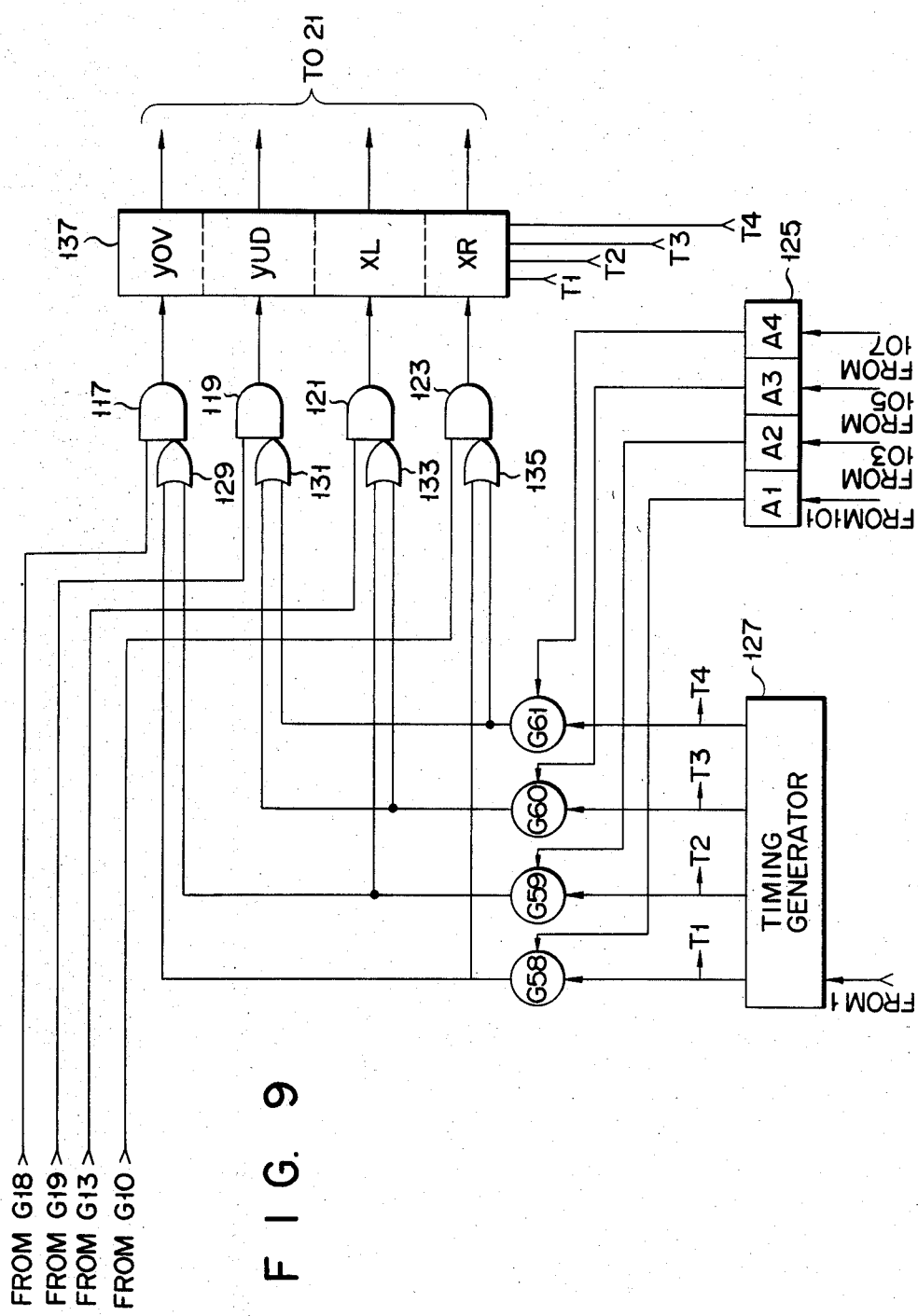
F I G. 9

F I G. 10A
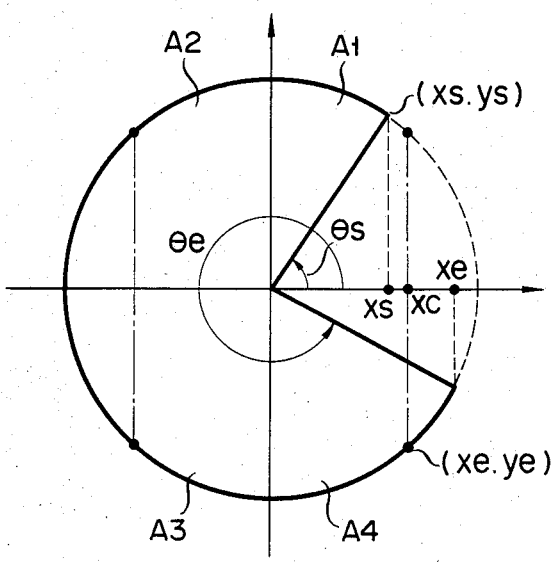
F I G. 10B
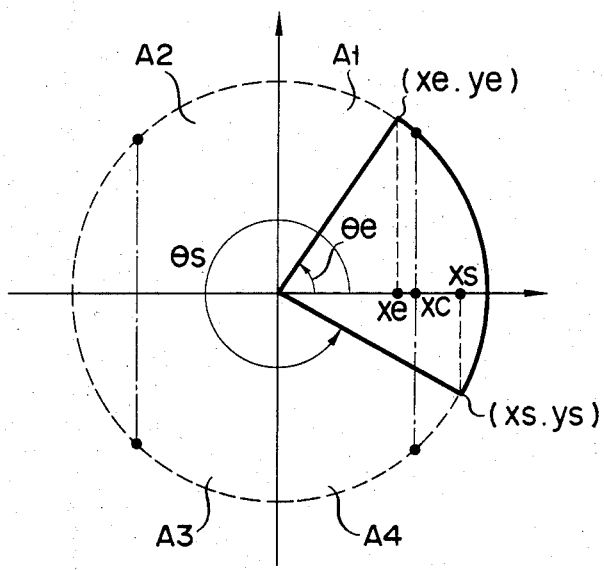

FIG. 11

STATUS BIT MAP

| | START ANGLE < END ANGLE | START ANGLE > END ANGLE | STATUS BIT |
|---|---|---|---|
| 1 | ALL WRITE | SKIP | 1 0 1 1 |
| 2 | START ANGLE | END ANGLE | 0 0 0 1 |
| 3 | END ANGLE | START ANGLE | 0 0 1 0 |
| 4 | SKIP | ALL WRITE | 0 0 0 0 |
| 5 | START & END ANGLE | START & END ANGLE | 0 1 0 0 |

FIG. 12A

FIRST OR THIRD QUADRANT

| | $xc \leq |xs|$ | $xc > |xs|$ |
|---|---|---|
| $xc \geq |xe|$ | 1 1 1 1 | 1 0 1 0 |
| $xc < |xe|$ | 1 0 0 1 | 1 0 0 0 |

FIG. 12B

SECOND OR FOURTH QUADRANT

| | $xc \leq |xs|$ | $xc > |xs|$ |
|---|---|---|
| $xc \geq |xe|$ | 1 0 0 0 | 1 0 0 1 |
| $xc < |xe|$ | 1 0 1 0 | 1 1 1 1 |

|  | A1 | A2 | A3 | A4 |
|---|---|---|---|---|
| F I G. 16A | 0 0 0 1 | 1 0 1 1 | 0 0 1 0 | 0 0 0 0 |

|  | A1 | A2 | A3 | A4 |
|---|---|---|---|---|
| F I G. 16B | 1 0 0 1 | 1 0 1 0 | 1 0 0 1 | 1 0 1 0 |

|  | A1 | A2 | A3 | A4 |
|---|---|---|---|---|
| F I G. 16C | 0 0 0 1 | 1 0 1 0 | 0 0 0 0 | 0 0 0 0 |

|  | A1 | A2 | A3 | A4 |
|---|---|---|---|---|
| F I G. 16D | 1 0 1 0 | 1 0 0 1 | 1 0 1 0 | 1 0 0 1 |

|  | A1 | A2 | A3 | A4 |
|---|---|---|---|---|
| F I G. 16E | 0 0 0 0 | 1 0 0 1 | 0 0 1 0 | 0 0 0 0 |

CIRCLE AND CIRCULAR ARC GENERATOR

BACKGROUND OF THE INVENTION

The present invention relates to a circle (including ellipse and circular arc) generator using a graphic display unit or the like.

When a circle is drawn on a graphic display unit of a personal computer or the like, calculations for sine and cosine are performed to obtain accurate graphic data. However, it takes time to calculate the sine and cosine values. For this reason, conventionally, an inscribed regular polygon having a predetermined internal angle is used to draw an approximate circle. Alternatively, peripheral dots of a quadrant are calculated, and the remaining quadrants are obtained as symmetrical ones about the x-axis, the y-axis and the origin, thereby increasing the drawing or generation speed.

As described above, when a given point is calculated, and then points symmetrical with the given point about the x-axis, the y-axis and the origin are calculated, only sign inversion is required if the center of the resultant circle corresponds to the origin of the x-y coordinate system. However, when the center of the circle does not coincide with the origin of the coordinate system, coordinate data corresponding to the center of the circle must be stored in a memory, and addition and subtraction must be performed with reference to the data of the origin. As a result, calculation processing becomes complicated, thereby decreasing the processing speed.

On the other hand, when a circle is drawn using an inscribed regular polygon, the cosine and sine values are calculated at a given interval such as 5, 10 or 15 degrees (the interval becomes small when a larger circle is drawn). A sufficiently precise circle can be drawn by using a regular polygon in a personal computer or the like. However, when an angle between the reference point (origin or center) and the start point of a circular arc is calculated, and an end angular position is calculated, the interval of 5, 10 or 15 degrees becomes insufficient. A smaller interval is required, so that the memory capacity of the table is increased, resulting in inconvenience. In addition, only sine and cosine values in the range of 0 to 90 degrees are stored in the table. Therefore, the CPU or the like must detect whether the sine or cosine value is positive or negative. Furthermore, when four points consisting of one reference point and three other points symmetrical therewith are simultaneously plotted in the x-y coordinate system, the symmetrical points may/may not be drawn in accordance with the quadrants of the x-y coordinate system. In addition to this disadvantage, when a means is provided to determine whether or not each of the four dots is plotted, the processing time is prolonged, resulting in inconvenience. In the case of simultaneously plotting all four dots or points in the x-y coordinate system, the calculation is performed only for the dot in the first quadrant (i.e., P(+x,+y)). Therefore, when the signs of the coordinates for drawing a circular arc have to be considered, circular arc generation processing becomes complicated.

SUMMARY OF THE INVENTION

It is an object of the present invention to provide a circle generator capable of generating a circle at high speed by easily calculating dots on a prospective circle without storing the coordinate data of the center of the prospective circle even if the center of the circle does not coincide with the origin of the x-y coordinate system.

It is another object of the present invention to provide a circular arc generator for generating circular arc at high speed by calculating a status bit and a position bit in accordance with a logic circuit arrangement and by determining whether or not circular arc data are plotted in accordance with the logic operation.

According to the present invention, x and y coordinate data of the rightmost and leftmost points on a circle in a specified coordinate system are calculated in accordance with the coordinate data obtained by a DDA (digital differential analyzer) and radius data. In addition, the x and y coordinate data in the specified coordinate system are incremented or decremented on the basis of the x and y coordinate data obtained from the DDA, thereby obtaining four coordinate data representing four points symmetrical about the origin and hence generating the circle at high speed.

When a start angle and an angle of a circular arc are given, a quadrant to which the end angle belongs, quadrants to be skipped, and all write quadrants are detected to obtain a status bit map. In addition, the present coordinate data is compared with the start point coordinate data and the end point coordinate data, and a position bit map is obtained. The status bit is logically ANDed with the position bit, thereby obtaining circular arc generation control data.

In order to achieve the above objects of the present invention, there is provided a circle generator comprising:

a digital differential analyzer for receiving a radius of a circle and generating x and y coordinates on the circle having a center at an origin;

first means for receiving the radius and a one-axis coordinate of a point of specific coordinates as a center of a target circle, and for performing addition and subtraction with respect to the radius and the one-axis coordinate to obtain one-axis coordinates of rightmost and leftmost points of the target circle; and second means for receiving the one-axis coordinates of the rightmost and leftmost points which are generated from said first means and the other-axis coordinate of the point of the specific coordinates, and for generating four points on the target circle which are symmetrical about the point of the specific coordinates, in accordance with the x and y coordinates generated from the DDA.

BRIEF DESCRIPTION OF THE DRAWINGS

Other objects and features of the present invention will be apparent from the following description taken in connection with the accompanying drawings, in which:

FIG. 2 is a block diagram of a circuit and circular arc generator according to an embodiment of the present invention;

FIG. 9 is a detailed circuit diagram of a latch section shown in FIG. 2;

FIGS. 10A and 10B show inverted circular arc, respectively;

FIG. 11 is a table showing a status bit map of the respective quadrants in the coordinate system;

FIG. 12A is a table showing a position bit map of the first and third quadrants, and FIG. 12B is a table showing a position bit map of the second and fourth quadrants;

FIGS. 16A to 16E are respectively representations for obtaining the status and position bit formats when a circular arc shown in FIG. 15 is plotted.

DETAILED DESCRIPTION OF THE PREFERRED EMBODIMENT

Figure 1A:
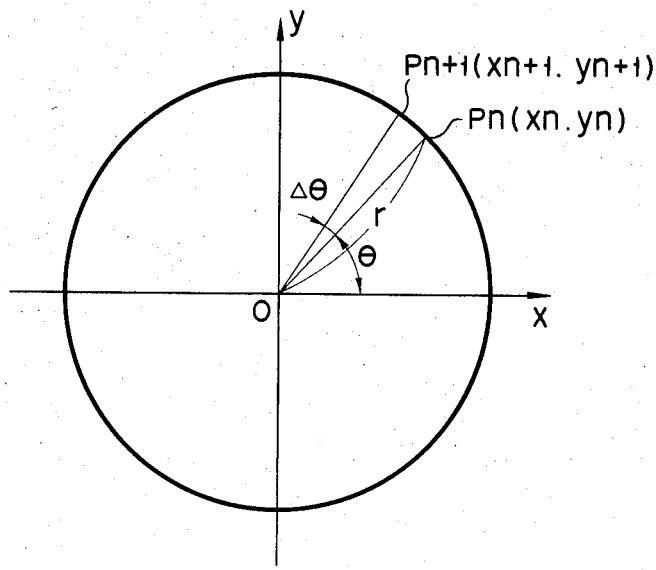
FIGS. 1A and 1B are respectively representations for explaining a circular arc generating means in a conventional digital differential analyzer (DDA)
Figure 1B:
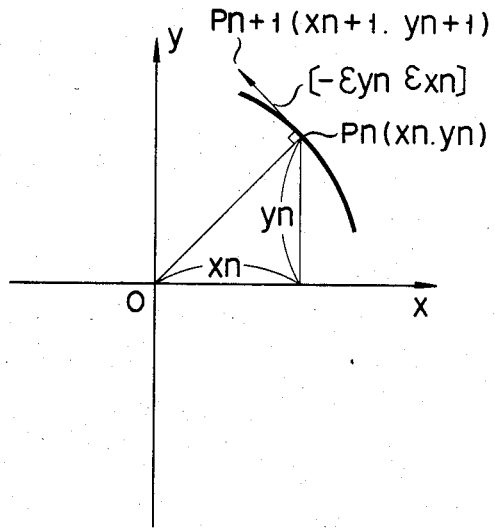

An embodiment of the present invention will be described with reference to the accompanying drawings. The present invention employs a DDA (digital differential analyzer) circular arc generation technique. First of all, the DDA will be schematically illustrated. Referring to FIGS. 1A and 1B, assume that a point $P_n(x_n,y_n)$ is given on a circle having a radius r. When this point is displaced through an angle $\Delta\theta$ counterclockwise along the circle, the resultant point $P_{n+1}(x_{n+1},y_{n+1})$ is calculated as:

$$x_{n+1} = r\cos(\theta + \Delta\theta) \quad (1)$$
$$= r\cos\theta\cos\Delta\theta - r\sin\theta\sin\Delta\theta$$
$$= x_n\cos\Delta\theta - y_n\sin\Delta\theta$$

$$y_{n+1} = r\sin(\theta + \Delta\theta) \quad (2)$$
$$= r\sin\theta\cos\Delta\theta + r\cos\theta\sin\Delta\theta$$
$$= y_n\cos\Delta\theta + x_n\sin\Delta\theta$$

In equations (1) and (2), the angle $\Delta\theta$ is very small. Therefore, if $\cos\Delta\theta \approx 1$ and $\sin\Delta\theta \approx \Delta\theta$, we have:

$$x_{n+1}=x_n-\Delta\theta\cdot y_n$$

$$y_{n+1}=y_n+\Delta\theta\cdot x_n$$

Furthermore, substitution of $\Delta\theta=\epsilon=2^{-m}$ (where m is a positive integer) in the above equations yields:

$$x_{n+1}=x_n-\epsilon\cdot y_n \quad (3)$$

$$y_{n+1}=y_n+\epsilon\cdot x_n \text{ for } 2^{m-1}<r<2^m \quad (4)$$

However, when equations (3) and (4) are used without modification, thay are diverged. $x_n$ in equation (4) must be substituted by $x_{n+1}$. Equations (3) and (4) are then rewritten:

$$x_{n+1}=x_{n+1}-\epsilon\cdot y_n \quad (5)$$

$$y_{n+1}=y_n+\epsilon\cdot x_n \quad (6)$$

It is conventionally known that values for a substantially true circle can be derived from equations (5) and (6) in this manner.

Referring to FIG. 2, the circle and circular arc generator of the present invention comprises a microprocessor 1, a digital differential analyzer (DDA) 3, a coordinate controller 5, and a circular arc or radii controller 7. The microprocessor 1 comprises: a read-only memory (ROM) 9 for storing a permanent program which allows the circle generator to perform predetermined operations in accordance with the flow charts of FIGS. 13A through 13E; a random access memory (RAM) 11 used as a working area; a central processing unit (CPU) 15 for controlling the DDA 3, the coordinate controller 5 and the circular arc controller 7 in accordance with the permanent program stored in the ROM 9; and an I/O port 13 for interfacing the CPU 15 with the DDA 3, the coordinate controller 5 and the circular arc or radii controller 7. The microprocessor 1 comprises, for example, an 8-bit microprocessor model 8049 available from Intel Corp., U.S.A. The microprocessor 1 supplies x and y coordinate data of the center of a circle at a point of coordinates specified by a user and data of a radius R of the circle to a buffer 17. The microprocessor 1 also supplies carry data and initialize data to the DDA 3. The DDA 3 calculates the circle or circular arc data having the center at the origin in accordance with the algorithm of equation (5) and (6). The circle data calculated by the DDA 3 are supplied to the coordinate controller 5. The coordinate controller 5 converts the circle or circular arc data (calculated by the DDA 3) with respect to the origin, to those with respect to the point of the specific coordinates. The circular arc controller 7 receives the start and end angles from the microprocessor 1 and the radius R from the DDA 3 and detects which quadrant or quadrants are used to plot the circle or circular arc. The circle or circular arc data from the coordinate controller 5 and the circular arc control data from the circular arc controller 7 are supplied to a display unit 21 through a latch section 19 and are displayed at the display unit 21. However, the display unit 21 may be replaced with an x-y plotter.

Figure 3:
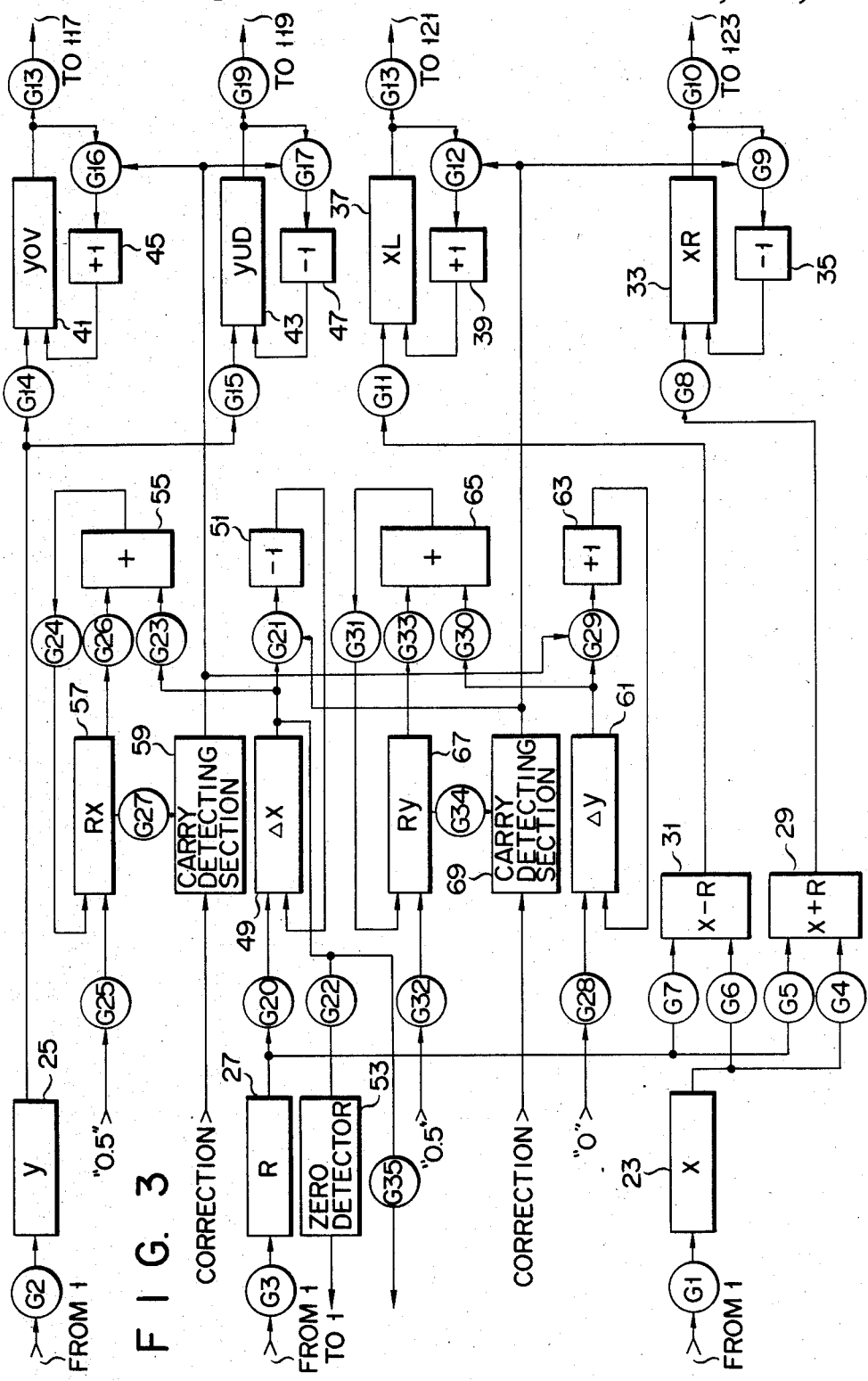
FIG. 3 is a detailed block diagram of a DDA and a coordinate controller in the generator shown in FIG. 2.

FIG. 3 is a detailed block diagram of the DDA 3 and the coordinate controller 5 shown in FIG. 2 in order to explain the operation of these components. The buffer 17 of FIG. 2 includes an X register 23, a Y register 25 and an R register 27.

The x register 23 holds x coordinate data specified by the user through the microprocessor 1 and a gate circuit G1. The y register 25 holds y coordinate data specified by the microprocessor 1 through a gate circuit G2. The R register 27 holds data which represents the radius of the circle and which is supplied from the microprocessor 1 through a gate circuit G3. The x and y coordinate data and the radius data are specified by the following user instruction:

CIRCLE(X,Y),RADIUS  (7)

Figure 4:
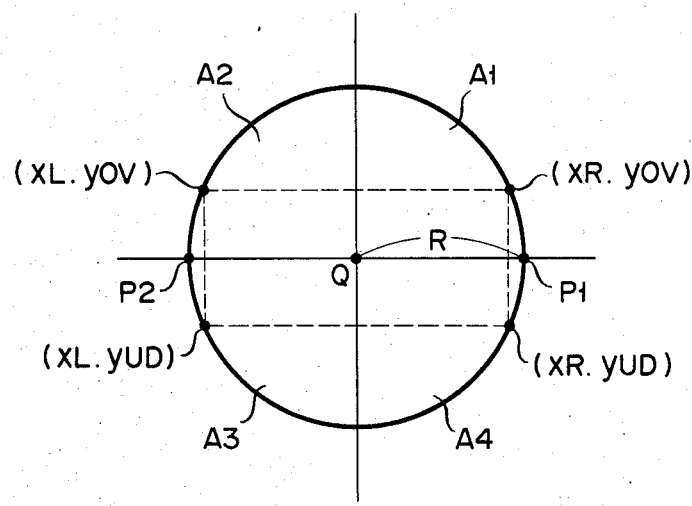
FIG. 4 is a representation showing a circle generating state.

It should be noted that the radius is given as a number of display dots. The data held by the x and R registers 23 and 27 are supplied to an adder 29 through gate circuits G4 and G5 and to a subtracter 31 through gate circuits G6 and G7. A sum output from the adder 29 is supplied to an $x_R$ register 33 through a gate circuit G8. The data loaded in the $x_R$ register 33 correspond to x coordinates in first and fourth quadrants A1 and A4, as shown in FIG. 4, respectively. These data are fed back to the input terminal of the $x_R$ register 33 through a gate circuit G9 and a $-1$ circuit 35 and to an AND gate 123 (FIG. 9) through a gate circuit G10. The subtracter 31 performs a substraction $(x-R)$. A subtracted result is supplied to an $X_L$ register 37 through a gate circuit G11. The data in the $X_L$ register 37 represents x coordinates of second and third quadrants A2 and A3, as shown in FIG. 4. These data are fed back to the input terminal of the $X_L$ register 37 through a gate circuit G12 and a $+1$ circuit 39 and to an AND gate 121 (FIG. 9) through a gate circuit G13.

On the other hand, the data held in the y register 25 is supplied to a $y_{OV}$ register 41 through a gate circuit G14 and to a $y_{UD}$ register 43 through a gate circuit G15. The data held by the $y_{OV}$ register 41 represent y-coordinates in the first and second quadrants A1 and A2 and are fed back to its input terminal through a gate circuit G16 and a $+1$ circuit 45. These data are also supplied to an AND gate 117 (FIG. 9) through a gate circuit G18. The data held by the $y_{UD}$ register 43 represent y-coordinates in the third and fourth quadrants A3 and A4, shown in FIG. 4. These data are fed back to the input terminal of the $y_{UD}$ register 43 through a gate circuit G17 and a $-1$ circuit 47 and to an AND gate 119 (FIG. 9) through a gate circuit G19.

The data held by the R register 27 is supplied to a $\Delta x$ register 49 through a gate circuit G20. The data held by the $\Delta x$ register 49 is supplied to a $-1$ circuit 51 through a gate circuit G21, and an output from the $-1$ circuit 51 is supplied to the $\Delta x$ register 49. The data held by the $\Delta x$ register 49 is also supplied to a zero detector 53 through a gate circuit G22. An output from the zero detector 53 is supplied to the microprocessor 1. The data held by the $\Delta x$ register 49 is supplied to an adder 55 through a gate circuit G23. An output from the adder 55 is supplied to an $R_x$ register 57 through a gate circuit G24. The microprocessor 1 supplies "0.5" as carry data to the $R_x$ register 57 through a gate circuit G25. The data held by the $R_x$ register 57 is supplied to the adder 55 through a gate circuit G26 and to a carry detecting section 59 through a gate circuit G27. When the carry detecting section 59 detects the carry signal from the $R_x$ register 57, the section 59 supplies a gate control signal to the gate circuits G16, G17 and G29 which are then enabled.

Initialize data "0" is supplied from the microprocessor 1 to a $\Delta y$ register 61 through a gate circuit G28. An output from the $\Delta y$ register 61 is fed back to the input terminal thereof through the gate circuit G29 controlled in response to an ouput from the carry detecting section 59 and through a $+1$ circuit 63. At the same time, the output from the $\Delta y$ register 61 is supplied to an $R_y$ register 67 through a gate circuit G30, an adder 65 and a gate circuit G31. The carry data "0.5" is supplied from the microprocessor 1 to the $R_y$ register 67 through a gate circuit G32. The data held by the $R_y$ register 67 is supplied to the adder 65 through a gate circuit G33 and to a carry detecting section 69 through a gate circuit G34. The carry detecting section 69 discriminates the presence/absence of a carry signal in the $R_y$ register 67. When the carry detecting section 69 detects the carry signal, the section 69 supplies a gate control signal to the gate circuits G9, G12 and G21 which are then enabled. The gate circuits G9, G12 and G21 are controlled by the carry detecting section 69, and the gate circuits G16, G17 and G29 are controlled by the carry detecting section 59. Other gate circuits are controlled in response to a gate control signal from the microprocessor 1. In addition, the microprocessor 1 selectively supplies the correction value to one or both the carry detecting sections 59 and 69.

Figure 5:
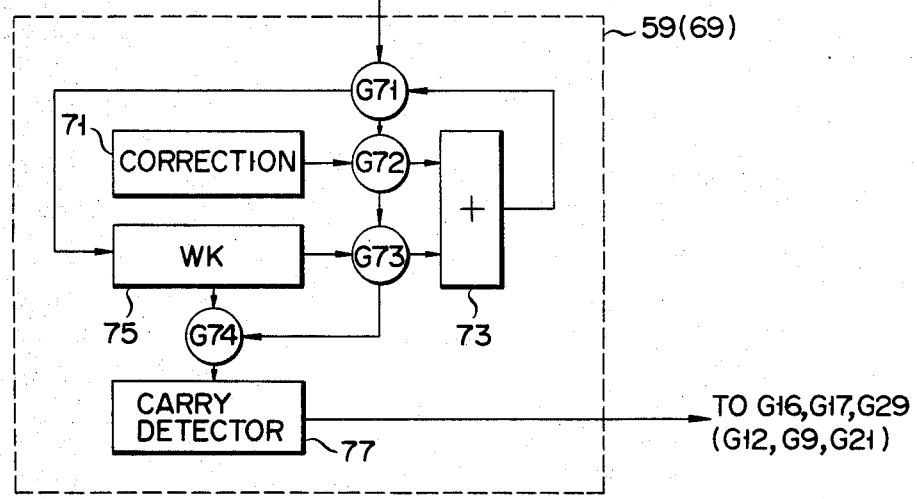
FIG. 5 is a detailed block diagram of a carry detecting section shown in FIG. 3.

A detailed block diagram of the carry detecting sections 59 and 69 is illustrated in FIG. 5. A correction register 71 receives from the microprocessor 1 the correction value for plotting the circular arc data at the graphic display unit in accordance with the ratios of vertical and horizontal intervals. The content of the correction register 71 is supplied to an adder 73 through a gate circuit G72. An output from a work register 75 is supplied to an adder 73 through a gate circuit G73. The adder 73 adds the contents of the correction register 71 and the work register 75. The sum is loaded in the work register 75 through the gate circuit G71. The data stored in the work register 75 is supplied to a carry detector 77 through the gate circuit G74 to detect the presence/absence of the carry signal. It should be noted that the gate circuits G71 through G74 in the carry detecting section 59 are controlled in response to the carry signal supplied from the $R_x$ register 57 of FIG. 3 through the gate circuit G27. Similarly, the gate circuits in the carry detecting section 69 are controlled in response to the carry signal supplied from the $R_y$ register 67 of FIG. 3 through the gate circuit G34.

Figures 6, 7:
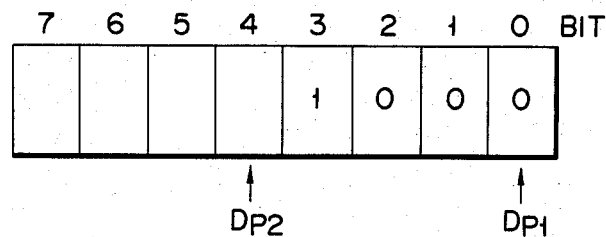
FIG. 6 is a representation showing a decimal position setting state in a resistor.
FIG. 7 is a representation for explaining the operation of the carry detecting section shown in FIG. 2.

In the carry detecting section 59 (or 69) having the arrangement as described above, when the ratio of longitudinal dot interval to transverse dot interval is set to be 1:0.5, carry data "0.5" is set in the correction register 71. In this case, the correction data having the same bit number as that of the radius data is set in the correction register 71. For example, when the radius data comprises 4-bit data, the decimal point is located at a position $D_{p2}$ corresponding to bit 4, as shown in FIG. 6. Therefore, when the correction value is given to be 0.5, binary data "1000" is written in the correction register 71. On the other hand, data "0" is set as the initial value in the work register 75. Therefore, when the carry signal is supplied from the $R_x$ register 57 through the gate circuit G27 to the carry detecting section 59, the gate circuits G71 through G74 shown in FIG. 5 are enabled. As a result, the content "1000" of the correction register 71 is added by the adder 73 to the content "0000" of the work register 75, as shown in FIG. 7. A sum "1000" is then written in the work register 75. The data written in the work register 75 is subjected to detection by the carrry detector 77 to determine whether the carry signal is present/absent. The carry detector 77 detects the carry signal on the basis of the decimal position $D_{p2}$ shown in FIG. 6. When the content of the work register 75 is set to be "1000", the carry detector 77 detects that the carry signal is not present. When the next carry signal is supplied from the $R_x$ register 57, the content "1000" of the correction register 71 is added by the adder 73 to the content "1000" of the work register 75. The sum "10000" is written in the work register 75. When bit 4 (fifth bit) is set, the carry detector 77 generates the carry detection signal to enable the gate circuits G16, G17 and G29 in FIG. 3.

Figure 8:
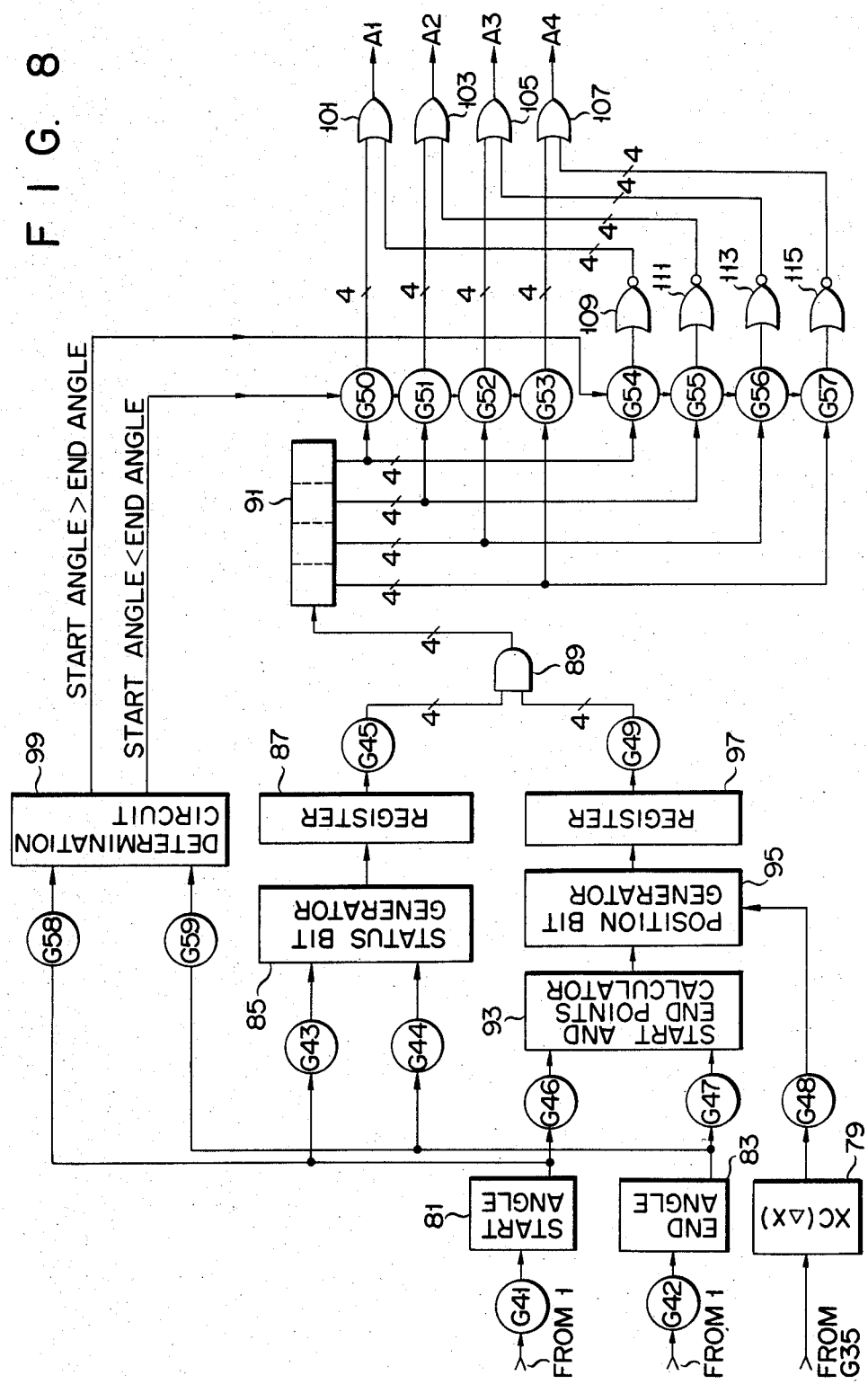
FIG. 8 is a detailed block diagram of a circular arc controller shown in FIG. 2.

FIG. 8 is a detailed block diagram to explain the operation of the circular arc controller 7. An $X_c$ register 79 holds the data supplied from the $\Delta x$ register 49 of FIG. 3 through a gate circuit G35. A start angle register 81 holds a start angle supplied from the microprocessor 1 through a gate circuit G41. An end angle register 83 holds an end angle supplied from the microprocessor 1 through a gate circuit G42. The start and end angle data respectively loaded in the registers 81 and 83 are supplied to a status bit generator 85 through gate circuits G43 and G44, respectively. The status bit generator 85 generates a 4-bit status bit in accordance with the start and end angle data. The resultant 4-bit status bit is set in a status bit register 87. The status bit set in the status bit register 87 is supplied to a 4-digit register 91 through a gate circuit G45 and an AND gate 89. Each digit of the register 91 comprises a 4-bit arrangement. The data held by the start and end angle registers 81 and 83 are also respectively supplied to a start and end points calculator 93 through gate circuits G46 and G47, respectively. The start and end points calculator 93 calculates a start point and an end point in accordance with the input data thereto. The calculated start and end point data are supplied to a position bit generator 95. The data held by the $x_c$ register 79 is also supplied to this position bit generator 95 through a gate circuit G48. The position bit generator 95 generates a 4-bit position data which is then set in a position bit register 97. The data held by the position bit register 97 is supplied to the register 91 through a gate circuit G49 and the AND gate 89. Outputs from the respective digits of the register 91 are directly supplied to the OR gates 101, 103, 105 and 107 through gate circuits G50 through G53, and indirectly supplied to the OR gates 101, 103, 105 and 107 through gate circuits G54 through G57 and NOR gates 109, 111, 113 and 115, respectively. The gate circuits G50 through G53 and G54 through G57 are controlled in response to an output from a determination circuit 99. The determination circuit 99 compares the start angle supplied from the register 81 through a gate circuit G58 with the end angle supplied from the register 83 through a gate circuit G59. When the start angle is larger than the end angle, the gate circuits G54 through G57 are enabled. However, when the start angle is smaller than the end angle, the gate circuits G50 through G53 are enabled. Outputs from the OR gates 101, 103, 105 and 107 are supplied as circular arc control signals of first through four quadrants to the latch section 19 shown in FIG. 2.

FIG. 9 is a detailed circuit diagram of the latch section 19 shown in FIG. 2. A non-zero detector 125 receives the circular arc control data A1 through A4 supplied from the OR gates 101, 103, 105 and 107 shown in FIG. 8. The non-zero detector 125 detects 4-bit circular arc control data of each of the first through four quadrants whether or not all bits are set at logic "0". When any one of the bits of the 4-bit data is set at logic "1", the non-zero detector 125 enables a corresponding one of the gate circuits G58, G59, G60 and G61 so as to supply a timing signal from a timing generator 127 to corresponding two of OR gates 129, 131, 133 and 135. In particular, when the circular arc control data corresponds to the first and/or second quadrants, the OR gate 129 receives the timing signal. When the circular arc control data corresponds to the third and/or fourth quadrants, the OR gate 131 receives the timing signal. Similarly, when the circular arc control signal corresponds to the second and/or third quadrants, the OR gate 133 receives the timing signal. Finally, when the circular arc control signal corresponds to the first and/or fourth quadrants, the OR gate 135 receives the timing signal. Each of outputs from the OR gates 129, 131, 133 and 135 is supplied to one input terminal of a corresponding one of the AND gates 117, 119, 121 and 123. Each of the data stored in the $y_{OV}$ register 41, the $y_{UD}$ register 43, the $X_L$ register 37 and the $X_R$ register 33 is supplied to the other input terminal of a corresponding one of the AND gates 117, 119, 121 and 123 through a corresponding one of the gate circuits G18, G19, G13 and G10. As a result, when the circular arc data to be plotted in the first and second quadrants are present, the AND gate 117 generates positive y coordinate data. When the circular arc data to be plotted in the third and fourth quadrants are present, the AND gate 119 generates negative y coordinate data. When the circular arc data to be plotted in the second and third quadrants are present, the AND gate 121 generates negative x coordinate data. When the data is to be plotted in the first and fourth quadrants are present, the AND gate 123 generates positive x coordinate data. Outputs from the AND gates 117, 119, 121 and 123 are supplied to a latch circuit 137. The latch circuit 137 generates the predetermined circular arc coordinate data in response to timing signals supplied from the timing generator 127.

The operation of the circular arc controller 7 shown in FIG. 8 will now be described.

Th microprocessor 1 detects the start and end angles of the circular angle and its radius in accordance with a user instruction (8):

CIRCLE(x,y),RADIUS,START ANGLE,END
ANGLE '(8)

where x and y are x and y coordinates specified by the user and corresponding to the center of the circular arc, RADIUS is the radius of the circular arc, START ANGLE is the start angle of the circular arc, and END ANGLE is the end angle of the circular arc.

The microprocessor 1 must detect which quadrant includes the start and end angles specified by the instruction. This detection can be performed by the following calculation. As shown in FIG. 10A, if the start angle $\theta_s$ falls within the first quadrant, and 90 degrees are subtracted therefrom, the resultant value becomes negative. However, if the resultant value becomes positive, the start angle $\theta_s$ must fall within the second or subsequent quadrant. 90 degrees are subtracted from the resultant value again to perform another detection. The operation continues until the resultant value becomes negative, thereby detecting which quadrant includes the start angle. The same operation as described above is performed for the end angle. Next, coordinates $(x_s, y_s)$ of the start point and coordinates $(x_e, y_e)$ of the end point are determined. The x coordinate $x_s$ of the start point is calculated in accordance with cos (radius/$x_s$)=start angle. The x coordinate $x_e$ can be calculated in the same manner. In addition, the y coordinate of the start or end point can be calculated in accordance with sin (radius/$y_s$ or $y_e$)=start angle.

The circular arc control data are then generated in accordance with the detected result to determine a quadrant or quadrants in which the start and end points are to be plotted. The circular arc control data consist of status bit data and position bit data. The status bit data consist of five statuses whose bit map is illustrated in FIG. 11. The status bit data is generated for every quadrant when detection is performed to determine a quadrant or quadrants to which the start and end angles belong. The five statuses are defined as follows:

(1) "ALL WRITE" status indicates plotting of all circular arc data within a given quadrant. For example, in order to plot the circular arc shown in FIG. 10A, the second and third quadrants correspond to the given quadrants. In this case, MSB (bit 3) is set.

(2) "START ANGLE" status indicates that the start angle belongs to a given quadrant. Referring to FIG. 10A, the given quadrant corresponds to the first quadrant A1. In this case, LSB bit (bit 0) is set.

(3) "END ANGLE" status indicates that the end angle belongs to a given quadrant. Referring to FIG. 10A, the given quadrant corresponds to the fourth quadrant A4. In this case, bit 1 is set.

(4) "SKIP" status indicates that the circular arc data are not plotted in a given quadrant. The second and third quadrants A2 and A3 in FIG. 10B correspond to the given quadrants. In this case, no bit is set.

(5) "START AND END ANGLE" status indicates that the start and end angles belong to a given quadrant. In this case, bit 2 is set.

The above statuses are applied to the case wherein the start angle $\theta_s$ is smaller than the end angle $\theta_e$. However, when the start angle $\theta_s$ is larger than the end angle $\theta_e$ (i.e., when a circular arc shown in FIG. 10B is plotted), the statuses for plotting the circular arc shown in FIG. 10A are inverted.

The position bit data is generated as data for determining whether or not the circular arc data in units of dots are plotted after the current x coordinate $x_c$ is compared with the x coordinates $x_s$ and $x_e$ of the start and end points. The position bit data are also generated independently with respect to the first through fourth quadrants. Bit maps of the position bit data are illustrated in FIGS. 12A and 12B. FIG. 12A shows the bit map for the first and third quadrants, and FIG. 12B shows the bit map for the second and fourth quadrants. The same patterns are applied to the first and third quadrants or the second and fourth quadrants since the pair of first and third quadrants and the pair of second and fourth quadrants are symmetrical about the origin, and only the signs are inverted. In this manner, the same calculation can be applied to each pair. Four types of position bit data can be defined as follows:

| (1) | A1 | A2 | A3 | A4 |
|---|---|---|---|---|
| | 1111 | 1000 | 1111 | 1000 | where (absolute value of x coordinate of the end point)≦(x coordinate of the current point)≦(x coordinate of the start point)

| (2) | A1 | A2 | A3 | A4 |
|---|---|---|---|---|
| | 1001 | 1010 | 1001 | 1010 | where (x coordinate of the current point)≦(absolute value of x coordinate of the start point) and (x coordinate of the current point)<(x coordinate of the end point)

| (3) | A1 | A2 | A3 | A4 |
|---|---|---|---|---|
| | 1010 | 1001 | 1010 | 1001 | where (x coordinate of the current point)>(absolute value of x coordinate of the start point) and (x coordinate of the current point)≧(absolute value of x coordinate of the end point)

| (4) | A1 | A2 | A3 | A4 |
|---|---|---|---|---|
| | 1000 | 1111 | 1000 | 1111 | where (absolute value of x coordinate of the start point)<(x coordinate of the current point)<(x coordinate of the end point)

These bit patterns are preset such that the circular arc data are plotted in units of quadrants when they have been logic ANDed with the status bit data. These bit patterns are expressed in matrix forms in FIGS. 12A and 12B for the pair of the first and third quadrants and the pair of second and fourth quadrants.

The operation of the circle or circular arc generator will now be described with reference to FIGS. 13A through 13E. Assume that a circle is to be plotted. In step 141 in FIG. 13A, a user instruction for circle (ellipse) or circular arc is detected. The microcomputer detects in step 143 whether the user instruction represents a circle or circular arc. When the microcomputer detects that the user instruction represents a circle, the x coordinate, y coordinate and the radius R are loaded in the x register 23, the y register 25 and the R register 27 through the gate circuits G1, G2 and G3, respectively, in step 145. For example, an 8-dot circle is plotted, bit 0 position is given as the decimal position $D_{p1}$, as shown in FIG. 6, and binary data "1000" (decimal "8") is set in the R register 27. In step 147, the x coordinate of the center of the circle and the radius R are added to obtain an x coordinate of the rightmost point of the circle. The x radius R is subtracted from the coordinate of the center of the circle to obtain an x coordinate of the leftmost point of the circle. In other words, referring to FIG. 3, the microprocessor 1 opens the gate circuits G4, G5, G6, G7, G8 and G11. The contents of the x register 23 and the R register G27 are added by the adder 29. A sum from the adder 29 is then set in the $x_R$ register 33. At the same time, the content of the x register 27 is substracted from that of the R register 23, and the subtracted result is loaded in the $x_L$ register 37. In addition, the microprocessor 1 opens the gate circuits G14 and G15 to load the y coordinate data in the $y_{OV}$ register 41 and the $y_{UD}$ register 43. In step 149, the microprocessor 1 opens the gate circuits G10, G13, G18 and G19 to transfer the x and y coordinate data held by the $x_R$ register 33, the $x_L$ register 37, the $y_{OV}$ register 41 and the $y_{UD}$ register 43 to the display unit 21 through the AND gates 117, 119, 121 and 123 and the latch circuit 137 shown in FIG. 9. At this time, since the y coordinate data of the central point Q is stored in the $y_{OV}$ and $y_{UD}$ registers without modification, a maximum point $P_1$ along the x-axis which is specified by the content of the $x_R$ register 33 and a minimum point $P_2$ along the x-axis which is specified by the content of the $x_L$ register 37 are plotted, as shown in FIG. 4.

In step 151, the microprocessor 1 opens the gate circuit G20 to transfer the radius R held by the R register 27 to the Δx register 49. The microprocessor 1 then opens the gate circuits G25, G32, G28 to set the carry data "0.5" in the $R_x$ and $R_y$ registers 57 and 67 and the initial value "0" in the Δy register 61. The carry data is then written in the $R_x$ and $R_y$ registers 57 and 67 such that the decimal point is located at the bit 4 ($D_{p2}$) position, as shown in FIG. 6. The binary data "1000" is written in the respective registers. In step 153, the gate circuits G30, G33 and G31 are opened to add the data held by the Δy register 61 and the $R_y$ register 67 by means of the adder 65. The sum is written in the $R_y$ register 67. In this case, binary addition is performed such that "0000"+"1000"="1000". The binary data "1000" is written in the $R_y$ register 67. In step 155, the microprocessor 1 opens the gate circuit G34 to read out the content of the $R_y$ register 67, and this readout data is supplied to the carry detecting section 69 which detects whether or not the carry signal is present. The carry data detection is performed such that the decimal position is set at the $D_{p2}$ position in the same manner as carry data writing, as shown in FIG. 6. When the content of the $R_y$ register 67 is set to be "1000", no carry detection signal is produced. In this manner, when the carry signal is not present, the flow advances to step 171 to open the gate circuits G23, G26 and G24. The contents "1000" of the Δx register 49 and the $R_x$ register 57 are then added by the adder 55. The sum "10000" is written in the $R_x$ register 57. In step 173, the microprocessor 1 opens the gate circuit G27 to read out the content of the $R_x$ register 57, and the readout signal is supplied to the carry detecting section 59 to detect whether or not the carry signal is present. This detection is performed such that the decimal position is set at the $D_{p2}$ position in the same manner as in the carry detecting section 69. When the content of the $R_x$ register 57 is set to be "10000", and bit 1 is set at the $D_{p2}$ position, the carry detecting section 59 generates the carry detection signal. This carry detection signal enables the gate circuit G29. In step 169, the content "0000" of the Δy register 61 is incremented by one by means of the +1 circuit 63. The +1 circuit 63 then generates the data "0001". In step 175, the microprocessor 1 opens the gate circuits G72 and G73 in the carry detecting section 59 to add the contents of the work register 75 and the correction register 71. When a vertically elongated ellipse is to be drawn, the microprocessor 1 sets the correction value (e.g., "0.5") in the correction register 71. In step 177, the gate circuit G74 (FIG. 5) is opened to transfer the content of the work register 75 to the carry detector 77, so that the carry detector 77 generates the carry detection signal.

The carry detection signal generated from the carry detector 77 enables the gate circuits G16 and G17. In step 179, the content of the $y_{OV}$ register 41 is incremented by one by means of the +1 circuit 45, and the content of the $y_{UD}$ register 43 is decremented by one by means of the −1 circuit 47. Thereafter, in step 183, the gate circuits G10, G13, G18 and G19 are opened to supply the data held by the $x_R$ register 33, the $x_L$ register 37, the $y_{OV}$ register 41 and the $y_{UD}$ register 43 to the display unit 21 through the latch circuit 137, thereby plotting the circle data. As shown in FIG. 4, x and y coordinates are plotted at the display unit 21 in the first quadrant A1 in accordance with the contents of the $x_R$ and $Y_{OV}$ registers 33 and 41; the x and y coordinates are plotted in the second quadrant A2 in accordance with the contents of the $x_L$ and $y_{OV}$ registers 41 and 37; the x and y coordinates are plotted in the third quadrant A3 in accordance with the contents of the $x_L$ and $y_{UD}$ registers 37 and 43; and the x and y coordinates are plotted in the fourth quadrant A4 in accordance with the contents of the $x_R$ and $y_{UD}$ registers 33 and 43. In this manner, the circle data are plotted with respect to the points $P_1$ and $P_2$ on the x-axis of FIG. 4. Thereafter, in step 185, the gate circuit G22 is opened to read out the content of the Δx register 49, and the readout data is supplied to the zero detector 53 which detects whether or not the data is "0". The result is supplied to the microprocessor 1. If the content of the Δx register 49 is not set at "0", the flow returns to step 153, and an operation similar to that described above is repeated. In step 155, when the carry signal is generated while the contents of the $R_y$ and Δy registers 67 and 61 are added, the flow advances to step 157. In step 157, the gate circuit G21 is opened in response to the carry detection signal generated from the carry detecting section 69, so that the content of the Δx register 49 is decremented by one by means of the −1 circuit 51. Thereafter, in step 159, the gate circuits 72 and 73 in the carry detecting section 69 are opened to add the contents of the work register 75 and the correction register 71. It should be noted that the correction value (e.g., "0.5") is set by the microprocessor 1 in the correction register 71 when a vertically elongated ellipse is to be plotted. In step 161, the gate circuit G74 is opened, so that the content of the work register 75 is supplied to the carry detector 77. As a result, the carry detection signal is generated by the carry detector 77.

The carry detection signal generated from the carry detecting section 69 enables the gate circuits G9 and G12, so that the content of the $x_R$ register 33 is decremented by one by the −1 circuit 35, and the content of the $x_L$ register 37 is incremented by one by the +1 circuit 39. The flow then advances to steps 165 and 167 to perform the same operations as in steps 171 and 173.

Figure 17:
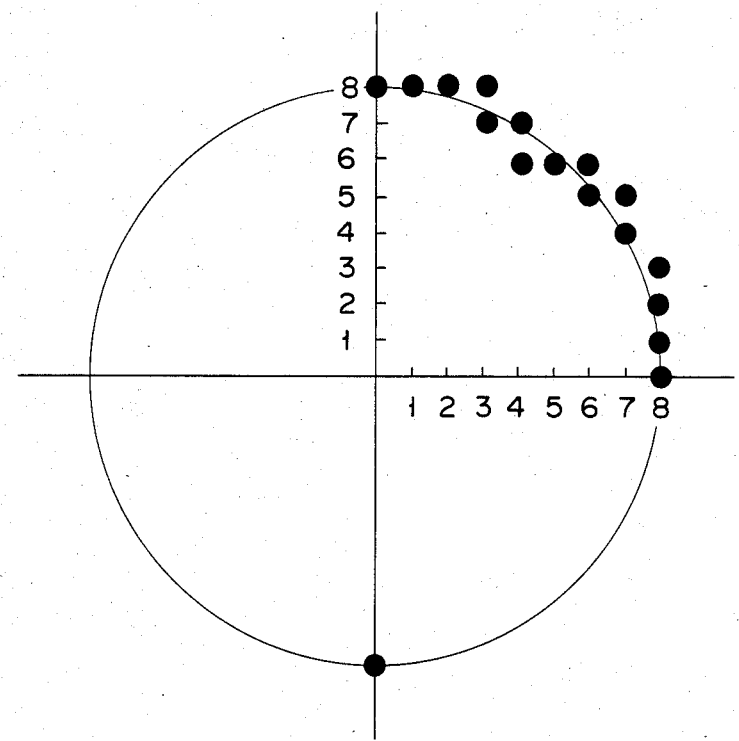
FIG. 17 is a representation showing a dot pattern of a quadrant when the circle is plotted in accordance with the flow charts shown in FIGS. 13A through 13E.

Thereafter, the flow advances to steps 175 to 185. Steps 153 to 185 represent a sequence of plotting one dot of the circle data and are repeated. In particular, the data of the radius R is supplied to a circuit consisting of the Δx register 49, the Δy register 61, the $R_x$ register 57, the $R_y$ register 67, the adders 65 and 55, the +1 circuit 63 and the −1 circuit 51 to calculate DDA values of the circle having the center at the origin. The DDA calculation is performed in accordance with equations (5) and (6), and the changes in x and y coordinates which are obtained by the DDA are supplied to the registers 33, 37, 41 and 43 so as to obtain circle data having the point Q as the center of the circle. In this case, as shown in FIG. 4, the circular arc is started from the points $P_1$ and $P_2$ on the x-axis. Since the upper and lower figures are symmetrical about the x-axis, the coordinates of the two points can be simultaneously obtained by single operation. The content (radius R) of the Δx register 49 is sequentially decremented in unitary decrements by the operation shown in FIGS. 13A through 13E until it reaches "0". The content "0" is detected by the zero detector 53. When the "0" detection signal is received by the microprocessor 1, the routine is ended. Dot plotting for only the first quadrant of the circle drawn in accordance with the flow charts is illustrated in FIG. 17. The dot data can be simultaneously plotted in the second, third and fourth quadrants in the same manner as in the first quadrant. The calculation data of $R_x$, Δx, $R_y$, Δy, and x and y coordinates are shown in Appendix I.

Appendix I

| cy (carry) | Rx | Δx | cy (carry) | Ry | Δy | (x, y) |
|---|---|---|---|---|---|---|
|  | 1000 | 1000 |  | 1000 | 0000 | (8, 0) |
|  | + |  |  | + |  |  |
|  |  |  |  | 1000 | 0000 |  |
| cy | 0000 | 1000 |  | 1000 | 0001 ↑ | (8, 1) |
|  |  |  |  | + |  |  |
|  | 0000 | 1000 |  | 1001 | 0001 |  |
|  | + |  |  |  |  |  |
|  | 1000 | 1000 |  | 1001 | 0001 |  |
|  |  |  |  | + |  |  |
|  | 1000 | 1000 |  | 1010 | 0001 |  |
|  | + |  |  |  |  |  |
| cy | 0000 | 1000 |  | 1010 | 0010 ↑ | (8, 2) |
|  |  |  |  | + |  |  |
|  | 0000 | 1000 |  | 1100 | 0010 |  |
|  | + |  |  |  |  |  |
|  | 1000 | 1000 |  | 1100 | 0010 |  |
|  |  |  |  | + |  |  |
|  | 1000 | 1000 |  | 1110 | 0010 |  |
|  | + |  |  |  |  |  |
| cy | 0000 | 1000 |  | 1110 | 0011 ↑ | (8, 3) |
|  |  |  |  | + |  |  |
|  | 0000 | 0111 ↓ | cy | 0001 | 0011 |  |
|  | + |  |  |  |  |  |
|  | 0111 | 0111 |  | 0001 | 0011 |  |
|  | + |  |  | + |  |  |
|  | 0111 | 0111 |  | 0100 | 0011 |  |
|  | + |  |  |  |  |  |
|  | 1110 | 0111 |  | 0100 | 0011 |  |
|  |  |  |  | + |  |  |
|  | 1110 | 0111 |  | 0111 | 0011 |  |
|  | + |  |  |  |  |  |
| cy | 0101 | 0111 |  | 0111 | 0100 ↑ | (7, 4) |
|  |  |  |  | + |  |  |
|  | 0101 | 0111 |  | 1011 | 0100 |  |
|  | + |  |  |  |  |  |
|  | 1100 | 0111 |  | 1011 | 0100 |  |
|  |  |  |  | + |  |  |
|  | 1100 | 0111 |  | 1111 | 0100 |  |
|  | + |  |  |  |  |  |
| cy | 0011 | 0111 |  | 1111 | 0101 ↑ | (7, 5) |
|  | 0011 | 0111 |  | 1111 | 0101 |  |
|  |  |  |  | + |  |  |
|  | 0011 | 0110 ↓ | cy | 0100 | 0101 | (6, 5) |
|  | + |  |  |  |  |  |
|  | 1001 | 0110 |  | 0100 | 0101 |  |
|  |  |  |  |  |  |  |
|  | 1001 | 0110 |  | 1001 | 0101 |  |
|  | + |  |  |  |  |  |
|  | 1111 | 0110 |  | 1001 | 0101 |  |
|  |  |  |  | + |  |  |
|  | 1111 | 0110 |  | 1110 | 0101 |  |
|  | + |  |  |  |  |  |
| cy | 0101 | 0110 |  | 1110 | 0110 ↑ | (6, 6) |
|  |  |  |  | + |  |  |
|  | 0101 | 0101 ↓ | cy | 0100 | 0110 | (5, 6) |
|  | + |  |  |  |  |  |
|  | 1010 | 0101 |  | 0100 | 0110 |  |
|  |  |  |  |  |  |  |
|  | 1010 | 0101 |  | 1010 | 0110 |  |
|  | + |  |  |  |  |  |
|  | 1111 | 0101 |  | 1010 | 0110 |  |
|  |  |  |  | + |  |  |
|  | 1111 | 0100 ↓ | cy | 0000 | 0110 | (4, 6) |
|  | + |  |  |  |  |  |
| cy | 0011 | 0100 |  | 0000 | 0111 ↑ | (4, 7) |
|  |  |  |  | + |  |  |
|  | 0011 | 0100 |  | 0111 | 0111 |  |
|  | + |  |  |  |  |  |
|  | 0111 | 0100 |  | 0111 | 0111 |  |
|  |  |  |  | + |  |  |
|  | 0111 | 0100 |  | 1110 | 0111 |  |
|  | + |  |  |  |  |  |
|  | 1011 | 0100 |  | 1110 | 0111 |  |
|  |  |  |  | + |  |  |
|  | 1011 | 0011 ↓ | cy | 0101 | 0111 | (3, 7) |
|  | + |  |  |  |  |  |
|  | 1110 | 0011 |  | 0101 | 0111 |  |
|  |  |  |  | + |  |  |

Appendix I-continued

| cy (carry) | Rx | Δx | cy (carry) | Ry | Δy | (x, y) |
|---|---|---|---|---|---|---|
|  | 1110 | 0011 |  | 1100 | 0111 |  |
|  | + |  |  |  |  |  |
| cy | 0001 | 0011 |  | 1100 | 1000 ↑ | (3, 8) |
|  | 0001 | 0011 |  | 1100 | 1000 |  |
|  |  |  |  | + |  |  |
|  | 0001 | 0010 ↓ | cy | 0100 | 1000 | (2, 8) |
|  | + |  |  |  |  |  |
|  | 0011 | 0010 |  | 0100 | 1000 |  |
|  |  |  |  | + |  |  |
|  | 0011 | 0010 |  | 1100 | 1000 |  |
|  | + |  |  |  |  |  |
|  | 0101 | 0010 |  | 1100 | 1000 |  |
|  |  |  |  | + |  |  |
|  | 0101 | 0001 ↓ | cy | 0100 | 1000 | (1, 8) |
|  | + |  |  |  |  |  |
|  | 0110 | 0001 |  | 0100 | 1000 |  |
|  |  |  |  | + |  |  |
|  | 0110 | 0001 |  | 1100 | 1000 |  |
|  | + |  |  |  |  |  |
|  | 0111 | 0001 |  | 1100 | 1000 |  |
|  |  |  |  | + |  |  |
|  | 0111 | 0000 ↓ | cy | 0100 | 1000 | (0, 8) |

It is possible to obtain a solid circle by obtaining line segment data between the coordinates $(x_R, y_{OV}) - (x_L, y_{OV})$ of the first and second quadrants A1 and A2 and between the coordinates $(x_L, y_{UD}) - (x_R, y_{UD})$ of the third and fourth quadrants A3 and A4. In this case, every time points on the circle are obtained, the corresponding line segment is drawn between the points. The boundary between the inside and the outside of the circle need not be discriminated. A solid circle or ellipse can thus be obtained at high speed.

Circular arc plotting will now be described with reference to FIGS. 13A through 13E. The steps described with reference to circle or ellipse plotting are omitted. When the circular arc is plotted, in step 187, the data held by the Δx register 49 is set as the x coordinate data $x_c$ in the $x_c$ register 79 of FIG. 8 through the gate circuit G35. The microprocessor 1 sets the start angle data in the start angle register 81 and the end angle data in the end angle register 83. Steps 187 to 223 represent a sequence to detect which quadrant or quadrants include the start and end angles and to compare the start angle with the end angle. The comparison between the current point and the start point and between the current point and the end point allows generation of the position bit pattern, as indicated by steps 225 to 237.

In step 189, the quadrant pointer is initialized to be "0". In step 191, the gate circuits G58 and G59 are opened to supply to the determination circuit 99 the start and end angles which are respectively set in the start and end angle registers 81 and 83. The determination circuit 99 compares the start angle with the end angle and determines whether or not the start angle is larger than the end angle. If YES in step 191, the end angle and the start angle are inverted in step 193. In step 195, 90 degrees are subtracted from the start angle and the sign of the resultant angle is determined. If the resultant angle is detected not to be negative in step 197 in FIG. 13D, the microprocessor 1 determines that the start angle is not present in a given quadrant. In step 213, a status bit map is prepared to skip the given quadrant. In step 215, the quadrant pointer is incremented, and the flow returns to step 195. The same operation is then repeated. However, if YES is step 197, the microprocessor 1 determines that the start angle is present in the given quadrant. In step 199, a status bit map is prepared wherein the start angle is present in the given quadrant. In addition, in steps 201 and 203, the microprocessor 1 detects whether or not the end angle is present in the same quadrant. In particular, when 90 degrees are subtracted from the end angle is step 201 and the resultant angle becomes negative in step 203, a status bit data ("0100" in FIG. 11) is prepared in step 217 wherein the status bit data represents that the start and end angles are located in the same quadrant. The flow then advances to step 221. However, if NO in step 203, the microprocessor 1 determines that the end and start angles are not present in the same quadrant. In step 205, the quadrant pointer is incremented. Thereafter, 90 degrees are subtracted from the resultant positive angle again. If the resultant angle still remains positive in step 209, the "ALL WRITE" status bit data is prepared in step 211, and the flow returns to step 205. Steps 205 to 211 are repeated until the end angle becomes negative. However, if YES in step 209, the status bit data is prepared wherein the end angle is present in the corresponding quadrant in step 219. The microprocessor 1 detects in step 221 whether or not the start angle is larger than the end angle. IF YES in step 221, the start and end angles are inverted in step 223. The flow advances to step 147.

Figure 13A:
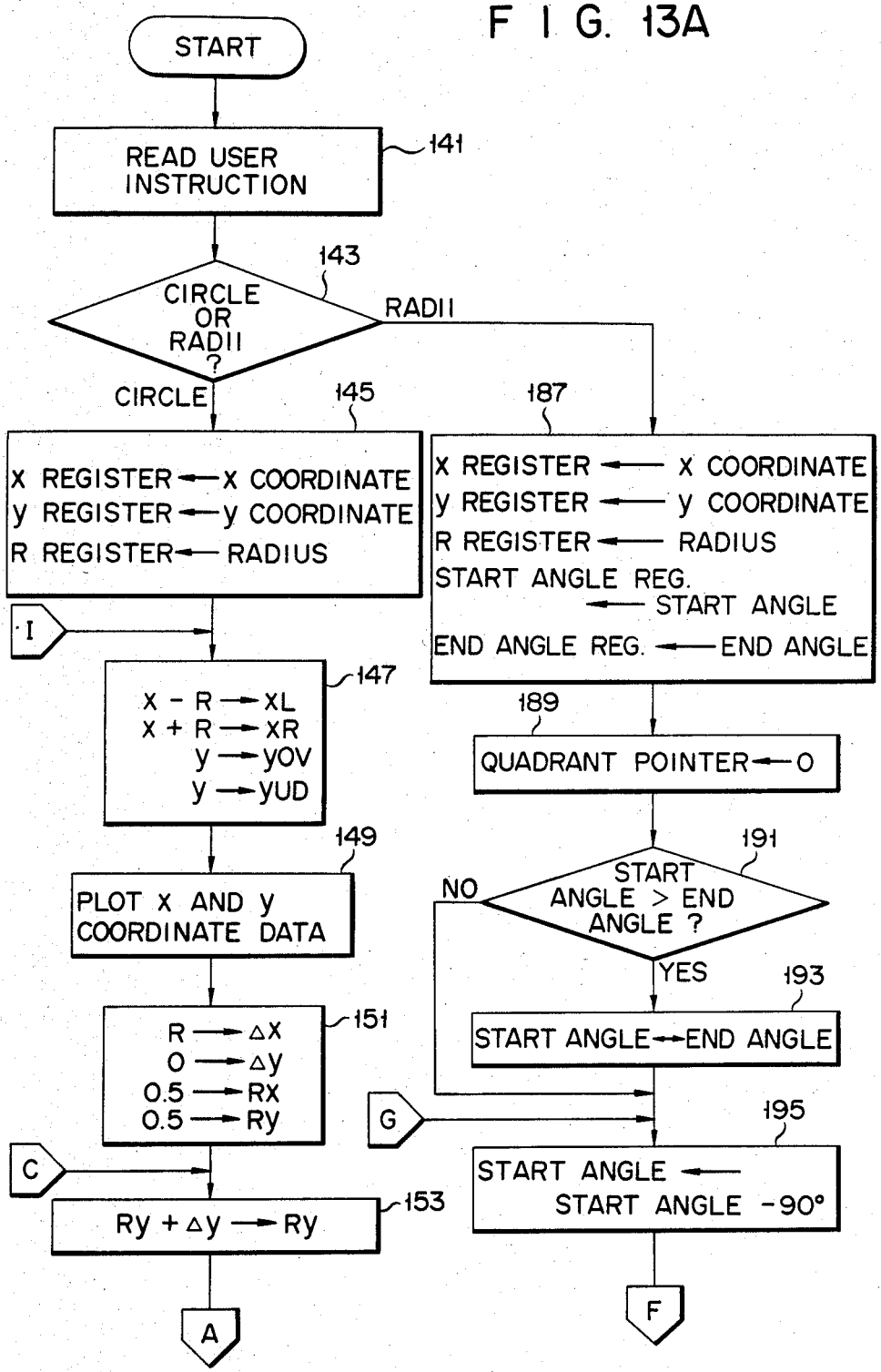
FIGS. 13A through 13E are respectively flow charts for explaining the operation of the circle generator shown in FIG. 2.
Figure 13B:
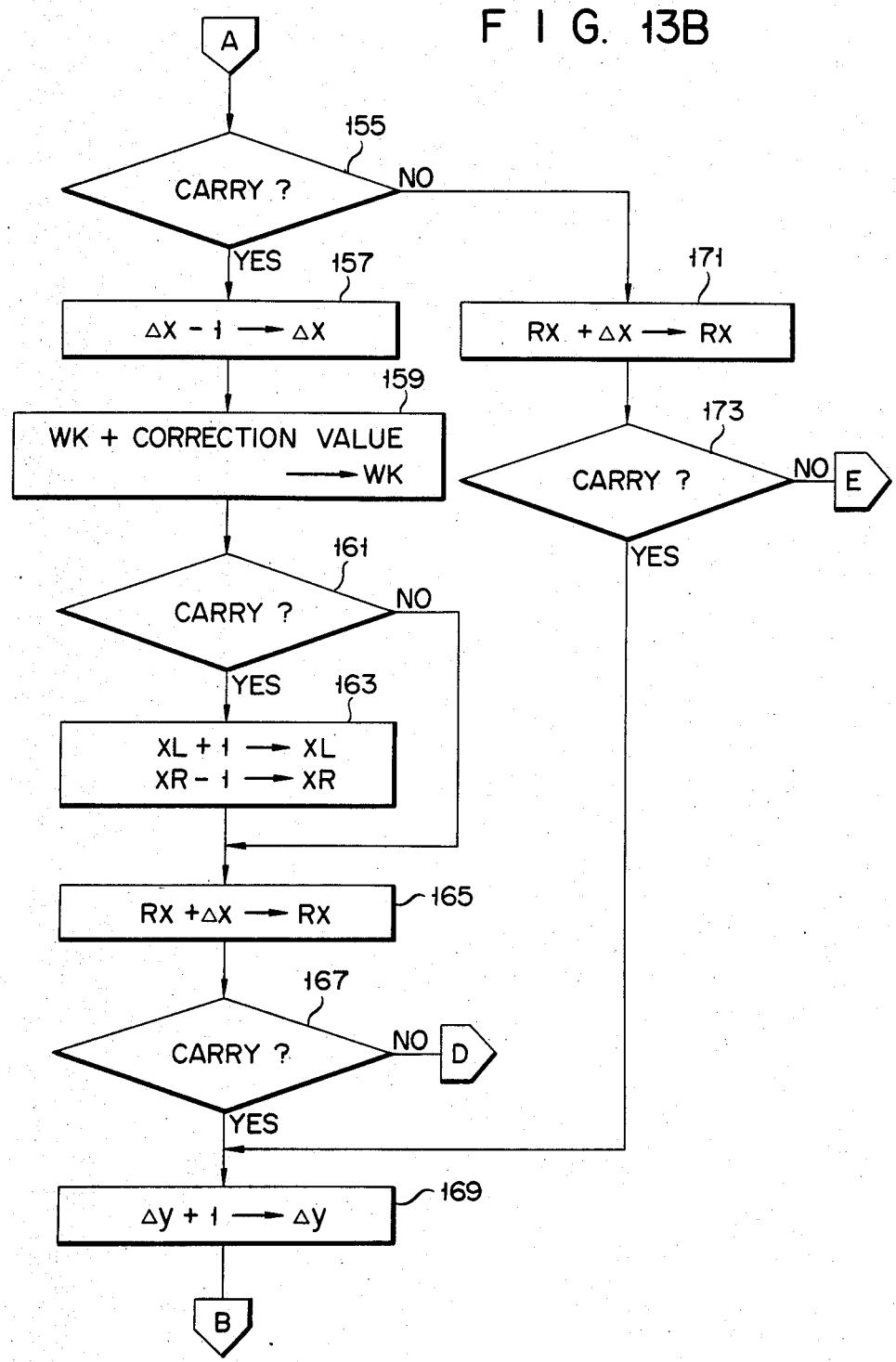
Figure 13C:
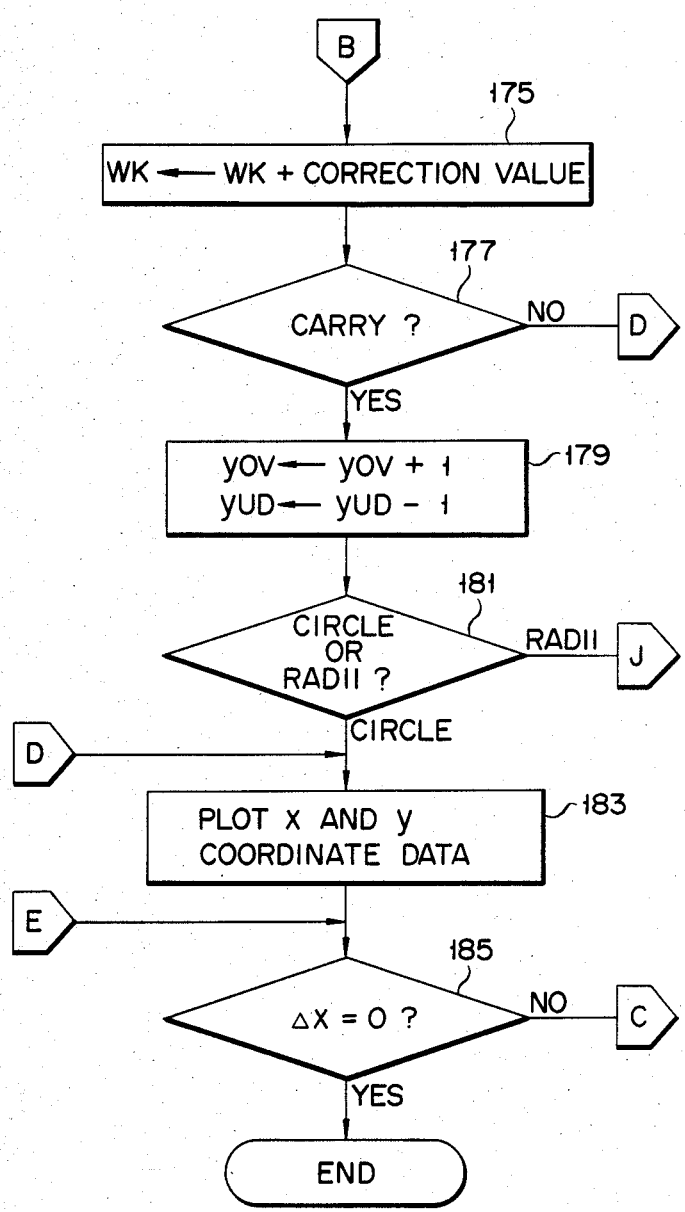
Figure 13D:
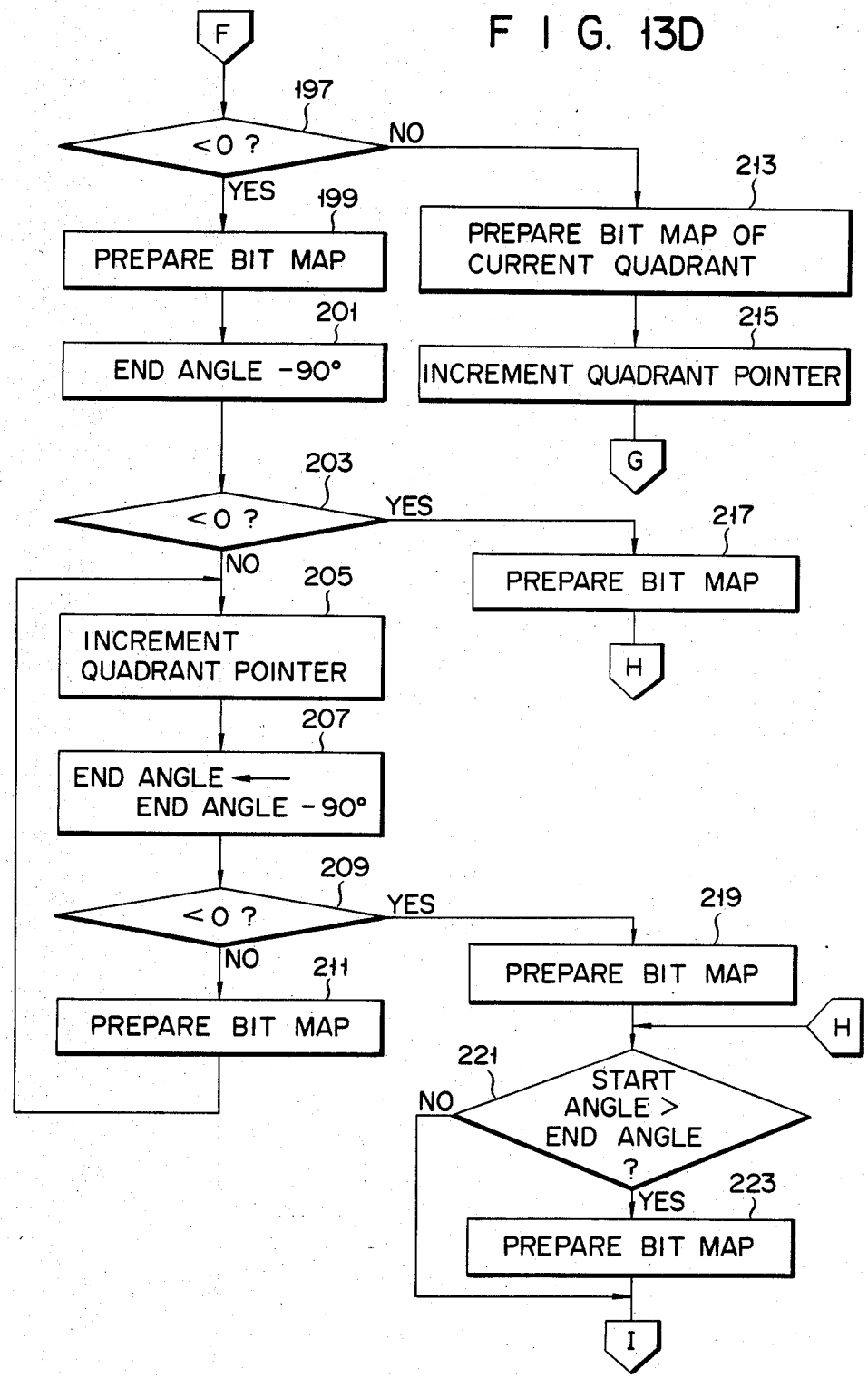
Figure 13E:
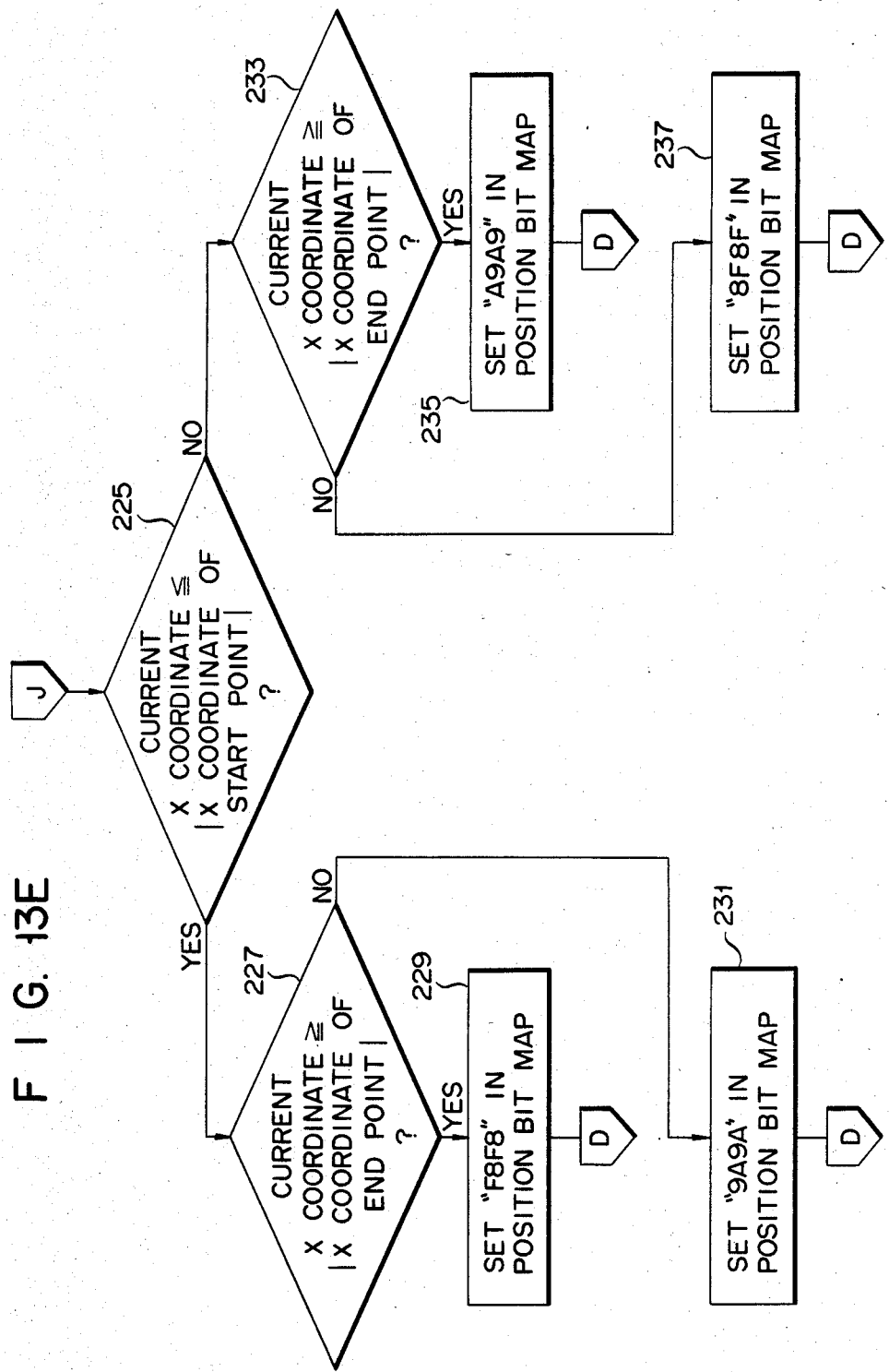
Figure 14:
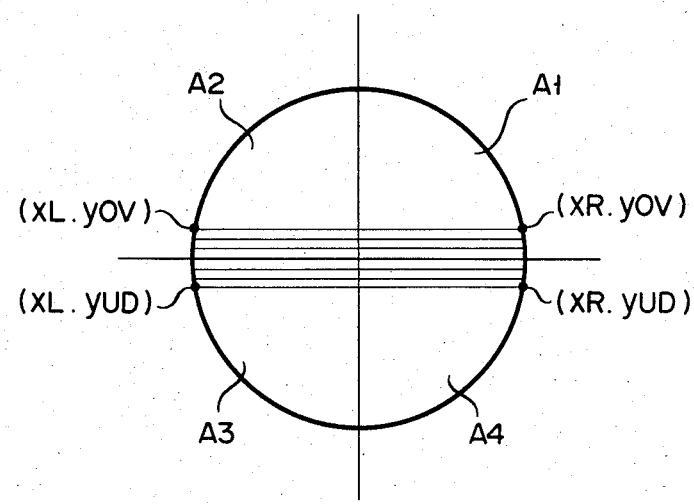
FIG. 14 is a representation for explaining the generation of a solid circle.

The position bit patterns are prepared by detecting in step 225 of FIG. 13E whether or not the current x coordinate is equal to or smaller than the absolute value of the x coordinate of the start point. If NO In step 225, the flow advances to step 233. The microcomputer 1 detects in step 233 whether or not the current x coordinate is larger than the absolute value of the x coordinate of the end point. If YES in step 233, the status bit data "A9A9" (hex) is prepared in step 235. However, if NO in step 233, the status bit data "8F8F" (hex) is set in step 237.

On the other hand, if YES in step 225, the microcomputer 1 detects in step 227 whether or not the current x coordinate is equal to or larger than the absolute value of the x coordinate of the end point. If YES in step 227, the data "F8F8" (hex) is set in step 229. Otherwise, the data "9A9A" (hex) is set in step 231.

The bit map preparation as previously mentioned is performed such that the data held by the start and end angle registers 81 and 83 are supplied to the status bit generator 85 through the gate circuits G43 and G44 so as to generate the status bit patterns of the respective quadrants. In the case of circular arc shown in FIG. 15, the start angle is present in the first quadrant A1, and the end angle is present in the third quadrant A3. The statuses of the respective quadrants are set as follows:
First quadrant A1 . . . START POINT
Second quadrant A2 . . . ALL WRITE
Third quadrant A3 . . . DESTINATION POINT
Fourth quadrant A4 . . . SKIP The status bit map shown in FIG. 11 is written in the status bit generator 85. The data held by the start and end angle registers 81 and 83 are supplied to the start and end point calculator 93 through the gate circuits G46 and G47. The start and end point calculator 93 calculates the start and end point positions. Outputs from the start and end point calculator 93 are supplied to the position bit generator 95. The position bit generator 95 generates position bit data compatible with the conditions shown in FIGS. 12A and 12B in accordance with data from the start and end point calculator 93 and the calculated x coordinate $x_c$ from the $X_c$ register 79. When the calculated coordinate (i.e., the coordinate data held by the $x_c$ register 79) corresponds to $x_c$ of FIG. 15, the following inequalities are satisfied:

$$x_c \leq |x_s|$$

$$x_c < |x_e|$$

The position bit data of the respective quadrants shown in FIG. 16B are prepared in accordance with the position bit maps shown in FIGS. 12A and 12B and are written in the position bit register 97. The data held by the status bit register 87 and the position bit register 97, as shown in FIGS. 16A and 16B are written in the register 91 through the gate circuits G45 and G49 and the AND gate 89. The data shown in FIG. 16C is obtained by the AND operation of the data shown in FIGS. 16A and 16B. The result data is written in the register 91. The data held by the start and end angle registers 81 and 83 are supplied to the determination circuit 99 through the gate circuits G58 and G59 so as to determine whether or not the data from the register 81 is larger than that from the register 83. In accordance with the determined result, the circuit 99 opens the gate circuits G50 through G53 or G54 through G57. The data held by the register 91 are supplied to the display unit 21 through the gate circuits G50 through G53 and the OR gates 101 through 107. The display unit 21 controls the respective quadrants in accordance with the data supplied from the register 91. In particular, meaningful data for the first and second quadrants A1 and A2, as shown in FIG. 16C, are subjected to plotting. In this case, none of the "0" bit data for the third and fourth quadrants A3 and A4 are subjected to plotting.

Figure 15:
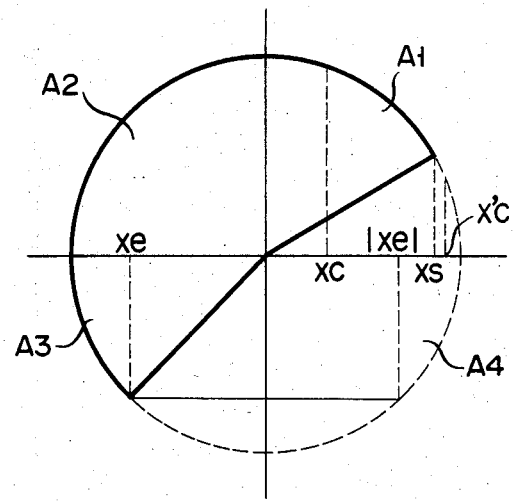
FIG. 15 is a representation for explaining the relationships between the current x coordinate $x_c$ and the start point x coordinate $x_s$ and between the current x coordinate $x_c$ and the end point x coordinate $x_e$.

When the calculated coordinate in FIG. 15 is given as $x_{c'}$:

$$x_{c'} > |x_s|$$

$$x_{c'} > |x_e|$$

The content of the position bit register 97 corresponds to the bit data shown in FIG. 16D in accordance with the bit maps of FIGS. 12A and 12B. The AND operation between the data shown in FIG. 16D and the content (FIG. 16A) of the status register 87 is performed to obtain the data shown in FIG. 16E. In accordance with the contents of the data shown in FIG. 16E, dot data are plotted in the second and third quadrants A2 and A3 but not in the first and fourth quadrants A1 and A4.

On the other hand, when the start angle is larger than the end angle, the output from the determination circuit 99 enables the gate circuits G54 through G57. For this reason, the data held by the register 91 are inverted by NOR gates 109 through 115. The inverted data are supplied to the display unit 21, so that inverted plotting and skipping operations are performed to draw the inverted circular arc.

In the above embodiment, the circle, ellipse and circular arc are graphically displayed. However, the figures may be printed by an x-y printer or the like.

What is claimed is:
1. A circle generator, comprising:
means for supplying a radius of a circle and start and end angles thereof;

digital differential analyzer (DDA) means coupled to said supplying means for receiving a radius of a circle, and including means for generating x and y coordinates to define a circle having said radius with a center at an origin;

first means coupled at least to said digital differential analyzer means for receiving said radius and one specified coordinate of a target circle center point along one axis of a two-axis system, and including means for performing addition and subtraction with respect to said radius and the one specified coordinate to generate coordinates of rightmost and leftmost points of a target circle along said one axis;

second means coupled to said first means for receiving the one-axis coordinates of the rightmost and leftmost points generated by said first means and another specified coordinate of the target circle center, and including means for providing four points on the target circle that are symmetrical about the center point in accordance with the x and y coordinates generated by said DDA means;

status bit generating means coupled to said supplying means for receiving start and end angles which define circular arcs to be displayed, and including means for generating status bits of respective quadrants of the target circle;

start and end point calculating means coupled to said supplying means for receiving the start and end angles and including means for calculating x and y coordinates of start and end points;

position bit generating means coupled to said start and end point calculating means for receiving outputs from said start and end point calculating means and for receiving said radius, and including means for generating position bits which represent relationships between coordinates of a current point and the coordinates of the start point, and between the coordinates of the current point and the coordinates of the end point;

determining means coupled to said supplying means, and including means for comparing the start angle with the end angle, and means for determining whether the start angle is larger or smaller than the end angle;

processing means coupled to said status bit generating means and to said position bit generating means, and including means for processing the status bits generated from said status bit generating means and the position bits generated from said position bit generating means, and means for generating enable/disable data which determines whether or not circular arc dots of the responsive quadrants are to be displayed;

inverting means coupled to said processing means and to said determining means to inverting the enable/disable data in accordance with a predetermined result of said determining means; and display means coupled to said processing means for displaying a dot pattern corresponding to the respective quadrants of the target circle in accordance with the operation of said processing means and said inverting means.

2. A generator according to claim 1, wherein the status bits comprise:

data representing that the start angle is present in a given quadrant;

data representing that the end angle is present in the given quadrant;

data representing that the start and end angles are both present in the given quadrant;

data representing that dots are to be displayed in the given quadrant; and data representing that dots are to be omitted from display in the given quadrant.

3. A generator according to claim 1, wherein the position bits comprise:

data representing that the coordinates of the current point are equal to or larger than the coordinates of the end point, and that the coordinates of the current point are equal to or smaller than the coordinates of the start point;

data representing that the coordinates of the current point are equal to or smaller than those of the start point, and that the coordinates of the current point are smaller than those of the end point;

data representing that the coordinates of the current point are larger than those of the start point, and that the coordinates of the current point are equal to or larger than those of the end point; and data representing that the coordinates of the current point are larger than those of the start point, and that the coordinates of the current point are smaller than those of the end point.

4. A generator according to claim 1, wherein said digital differential analyzer means comprises correcting means having:

first register means for setting correction data for plotting an ellipse;

second register means for setting circle coordinate data;

adder means for adding contents of said first and second register means; and carry detecting means for detecting a carry signal from a sum generated from said adder means.

5. A generator according to claim 2, wherein said digital differential analyzer means comprises correcting means having:

first register means for setting correction data for plotting an ellipse;

second register means for setting circle coordinate data;

adder means for adding contents of said first and second register means; and carry detecting means for detecting a carry signal from a sum generated from said adder means.

6. A generator according to claim 3, wherein said digital differential analyzer means comprises correcting means having:

first register means for setting correction data for plotting an ellipse;

second register means for setting circle coordinate data;

adder means for adding contents of said first and second register means; and carry detecting means for detecting a carry signal from a sum generated from said adder means.

7. An ellipse generator, comprising:

means for supplying a radius of a circle;

digital differential analyzer (DDA) means coupled to said supply means for receiving a radius of a circle, and including means for generating x and y coordinates to define a circle having said radius with a center at an origin, said DDA means further including correcting means having:

first register means for setting correction data for plotting an ellipse;

second register means for setting circle coordinate data;

adder means coupled to said first and second register means for adding contents of said first and second register means; and carry detecting means coupled to said adder means for detecting a carry signal from a sum generated from said adder means;

first means coupled at least to said digital differential analyzer means for receiving said radius and one specified coordinate of a target circle center point along one axis of a two-axis system, and including means for performing addition and subtraction with respect to said radius and the one specified coordinate to generate coordinates of rightmost and leftmost points of a target circle along said one axis; and second means coupled to said first means for receiving the one-axis coordinates of the rightmost and leftmost points generated by said first means and another specified coordinate of the target circle center, and including means for providing four points on the target circle that are symmetrical about the center point, in accordance with the x and y coordinates generated by said DDA means.

8. A generator according to claim 7, wherein said correcting means is operated such that the correction data is added to the x coordinates of the target circle when an ellipse elongated along an x-axis is to be displayed and so that the correction data is added to the y coordinates of the target circle when an ellipse elongated along a y-axis is to be displayed.

9. A circle generator, comprising:
means for supplying a radius of a circle;

digital differential analyzer (DDA) means coupled to said supplying means for receiving a radius of a circle, and including means for generating x and y coordinates to define a circle having said radius with a center at an origin; and controlling means coupled at least to said digital differential analyzer means for receiving said radius and one specified coordinate of a target circle center point along one axis of a two-axis system, and including means for performing addition and subtraction with respect to said radius and the one specified coordinate to generate coordinates of rightmost and leftmost points of a target circle along said one axis, and means for receiving another specified coordinate of the target circle center point and providing four points on the target circle that are symmetrical about the center point by incrementing and decrementing x and y coordinates of the specified coordinates of the target circle center point;

said controlling means comprising a microprocessor coupled to said DDA means and including a central processing unit (CPU) for receiving the specified coordinates of the target circle center point, said radius, the start angle and the end angle of a target circular arc; and a read-only memory device coupled to said CPU for storing a program compatible with operations of said CPU to perform determined operations of said controlling means; and said CPU including means for generating status bits for respective quadrants in accordance with the start and end angles, means for calculating start and end points in accordance with the start and end angles, means for generating position bits representing relations between the coordinates of a current point and those of the start point, and between coordinates of the current point and those of the end point, and means for processing the status bits and the position bits together with enable/disable data for producing a dot display of the respective quadrants.

10. A generator according to claim 9, wherein said microprocessor inverts the enable/disable data in accordance with a determination result representing whether or not the start angle is larger than the end angle.

11. A generator according to claim 9, wherein the status bits comprise:
data representing that the start angle is present in a given quadrant;

data representing that the end angle is present in the given quadrant;

data representing that the start and end angles are both present in the given quadrant;

data representing that dots are plotted in the given quadrant; and data representing that dots are skipped in the given quadrant.

12. A generator according to claim 9, wherein the position bits comprise:
data representing that the coordinates of the current point are equal to or larger than the coordinates of the end point and that the coordinates of the current point are equal to or smaller than the coordinates of the start point;

data representing that the coordinates of the current point are equal to or smaller than those of the start point and that the coordinates of the current point are smaller than those of the end point;

data representing that the coordinates of the current point are larger than those of the start point and that the coordinates of the current point are equal to or larger than those of the end point; and data representing that the coordinates of the current point are larger than those of the start point and that the coordinates of the current point are smaller than those of the end point.

13. A circle generating system, comprising:
buffer means for holding x and y coordinates of a specified point, and a radius of a target circle with the specified point as a center;

digital differential analyzer (DDA) means coupled to said buffer means for receiving a radius of a circle with a center at an origin, and for generating x and y coordinates to define the circle;

x and y coordinate data generating means for receiving the specified x and y coordinates of the specified center point held in said buffer means, and the x and y coordinates defining the circle as generated from said DDA means, and including means for providing x and y coordinates of four points on the target circle that are symmetrical about the center point;

display means for receiving the x and y coordinates from said x and y coordinate data generating means and including means for displaying a corresponding circle;

status bit generating means for receiving start and end angles which define circular arcs to be displayed, and including means for generating status bits of respective quadrants of the target circle;

start and end point calculating means for receiving the start and end angles, and including means for calculating x and y coordinates of start and end points;

position bit generating means for receiving outputs from said start and end point calculating means and said radius, and including means for generating position bits which represent relationships between the coordinates of a current point and the coordinates of the end point;

determining means including means for comparing the start angle with the end angle, and means for determining if the start angle is larger than the end angle;

processing means including means for processing the status bits generated from said status bit generating means and the position bits generated from said position bit generating means, and means for generating enable/disable data which determine whether or not circular arc dots of the respective quadrants are to be displayed; and means for inverting the enable/disable data in accordance with a determination result of said determining means.

14. A generator according to claim 13, wherein the status bits comprise:

data representing that the start angle is present in a given quadrant;

data representing that the end angle is present in the given quadrant;

data representing that the start and end angles are present in the given quadrant;

data representing that dots are plotted in the given quadrant; and data representing that dots are skipped in the given quadrant.

15. A generator according to claim 13, wherein the position bits data comprise:

data representing that the coordinates of the current point are equal to or larger than the coordinates of the end point and that the coordinates of the current point are equal to or smaller than the coordinates of the start point;

data representing that the coordinates of the current point are equal to or smaller than those of the start point and that the coordinates of the current point are smaller than those of the end point;

data representing that the coordinates of the current point are larger than those of the start point and that the coordinates of the current point are equal to or larger than those of the end point; and data representing that the coordinates of the current point are larger than those of the start point and that the coordinates of the current point are smaller than those of the end point.

16. An ellipse generator, comprising:

means for supplying a radius of a circle, and start and end angles of a circular arc;

digital differential analyzer (DDA) means coupled to said supplying means for receiving a radius of a circle, and including means generating x and y coordinates to define a circle having said radius with a center at an origin; and controlling means coupled at least to said digital differential analyzer means for receiving said radius and one specified coordinate of a target circle center point along one axis of a two-axis system, and including means for performing addition and subtraction with respect to said radius and the one specified coordinate to generate coordinates of rightmost and leftmost points of a target circle along said one axis, means for receiving another specified coordinate of the target circle center point and providing four points on the target circle that are symmetrical about the center point by incrementing and decrementing x and y coordinates of the specified coordinates of the target circle center, and means for controlling said DDA means to add correction data to the x coordinates of the target circle when an ellipse elongated along an x-axis is to be displayed and to add the correction data to the y coordinates of the target circle when an ellipse elongated along a y-axis is to be displayed.

* * * * *